US012685682B2

(12) United States Patent
Infantas et al.

(10) Patent No.: US 12,685,682 B2
(45) Date of Patent: Jul. 21, 2026

(54) THIN PROFILE RETRACTOR APPARATUS AND SYSTEMS

(71) Applicant: Valeda Company, LLC, Oakland Park, FL (US)

(72) Inventors: Rudy Infantas, Margate, FL (US); Paul Slevinsky, Brockville (CA); Ovidius Turcanu, Delray Beach, FL (US); Jorge Torres, Boca Raton, FL (US); William Ott, Fort Lauderdale, FL (US); Edgardo Cardona, Pompano Beach, FL (US)

(73) Assignee: Valeda Company, LLC, Oakland Park, FL (US)

( * ) Notice: Subject to any disclaimer, the term of this patent is extended or adjusted under 35 U.S.C. 154(b) by 946 days.

(21) Appl. No.: 17/885,324

(22) Filed: Aug. 10, 2022

(65) Prior Publication Data

US 2023/0048271 A1     Feb. 16, 2023

Related U.S. Application Data

(60) Provisional application No. 63/232,804, filed on Aug. 13, 2021.

(51) Int. Cl.
*A61G 3/08* (2006.01)
*B60P 7/08* (2006.01)

(52) U.S. Cl.
CPC .............. *A61G 3/0808* (2013.01); *B60P 7/08* (2013.01)

(58) Field of Classification Search
CPC ........ A61G 3/0808; A61G 3/08; B60N 2/005; B60N 2/01508; B60N 2/245; B60P 3/06;
(Continued)

(56) References Cited

U.S. PATENT DOCUMENTS 6,406,230 B1    6/2002  Mason et al.
8,636,451 B2 *  1/2014  Yamashita ........... A61G 3/0808
                                                  410/23
(Continued)

FOREIGN PATENT DOCUMENTS

JP           3933428 B2      6/2007
JP           5200472 B2 *    6/2013
WO      WO-2015144099 A2 *  10/2015  ........... A61G 3/0808

OTHER PUBLICATIONS

Bar Products; product website; https://barproducts.com/products/heavy-duty-industrial-wall-mount-retractable-reel?srsltid=AfmBOoo0Gk05sFAH_o5dEJOqSA6kx90D6pa2ulEObFDFinwpTXHrbziv; accessed May 28, 2025, published Mar. 29, 2014. (Year: 2014).*

*Primary Examiner* — Amy R Weisberg
*Assistant Examiner* — Philip C Adams
(74) *Attorney, Agent, or Firm* — Daniel Tallitsch; Tyler Schultz

(57)                ABSTRACT
A thin profile retractor allows for a wheelchair securement system to be installed in-floor without the need for large holes to be cut into the OEM vehicle flooring. A plurality of thin profile retractors may be combined in a single housing to define a drop-in, in-floor system. The thickness of the in-floor system is approximately equal to or slightly thicker than the thickness of the type of aftermarket flooring that is typically placed on top of the OEM flooring or vehicle frame—for example, plywood. In that regard, a large hole corresponding to the outline of the in-floor system need only be cut in the aftermarket flooring, and only small holes need to be drilled to secure the in-floor system to the vehicle frame. The thin profile retractor includes specialized components and component configurations that permit the thin profile and/or allow the retractor to perform better during accident scenarios.

20 Claims, 23 Drawing Sheets

(58) Field of Classification Search
       CPC ......... B60P 7/0823; B60P 7/08; B60P 7/0807;
                    B60P 3/073; B60P 7/0815; B60R 22/22;
                             B60R 22/34; B60Y 2200/84
       USPC .......................................................... 410/7
       See application file for complete search history.

(56)                      References Cited

U.S. PATENT DOCUMENTS

| | | | |
|---|---|---|---|
| 9,333,129 B2 * | 5/2016 | Cardona | ............... B60P 7/0823 |
| 2014/0369778 A1 | 12/2014 | Hermanson et al. | |
| 2020/0377054 A1 | 12/2020 | Jessup | |

* cited by examiner

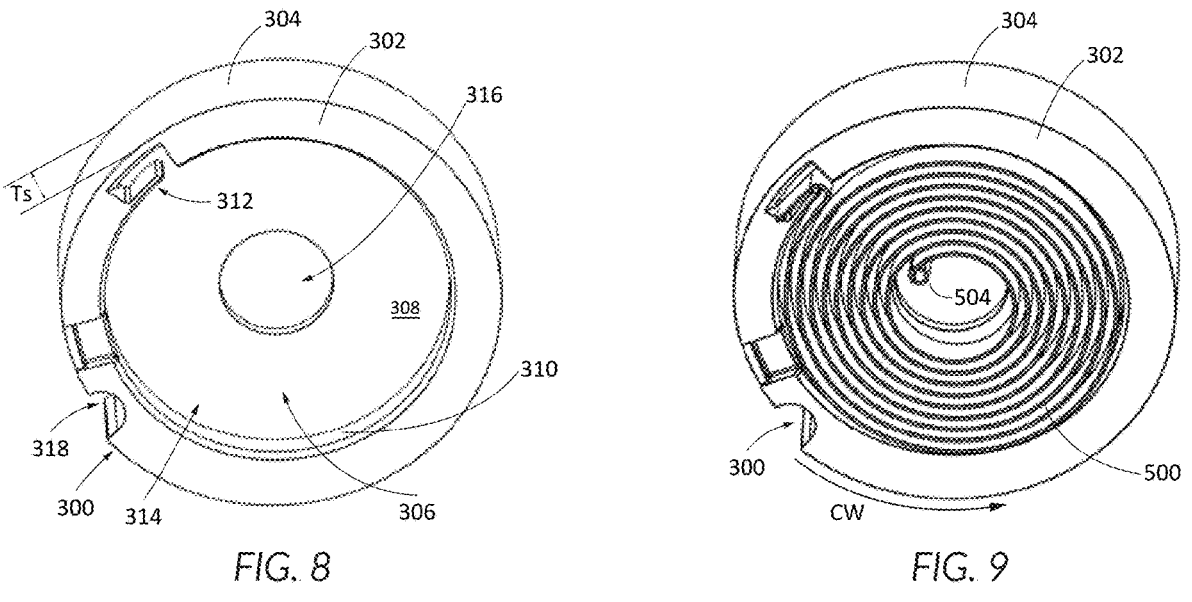
FIG. 8
FIG. 9
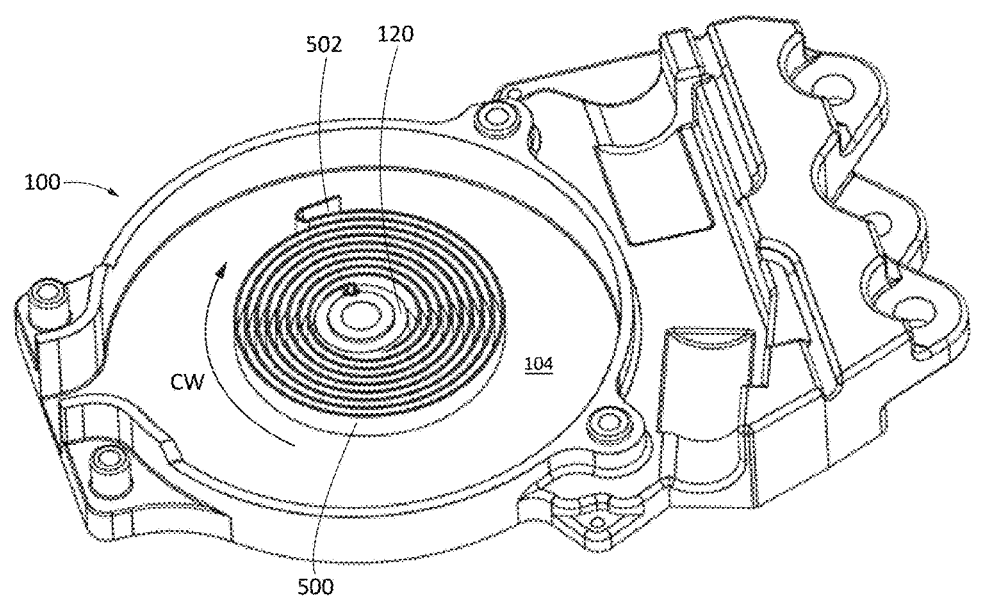
FIG. 10

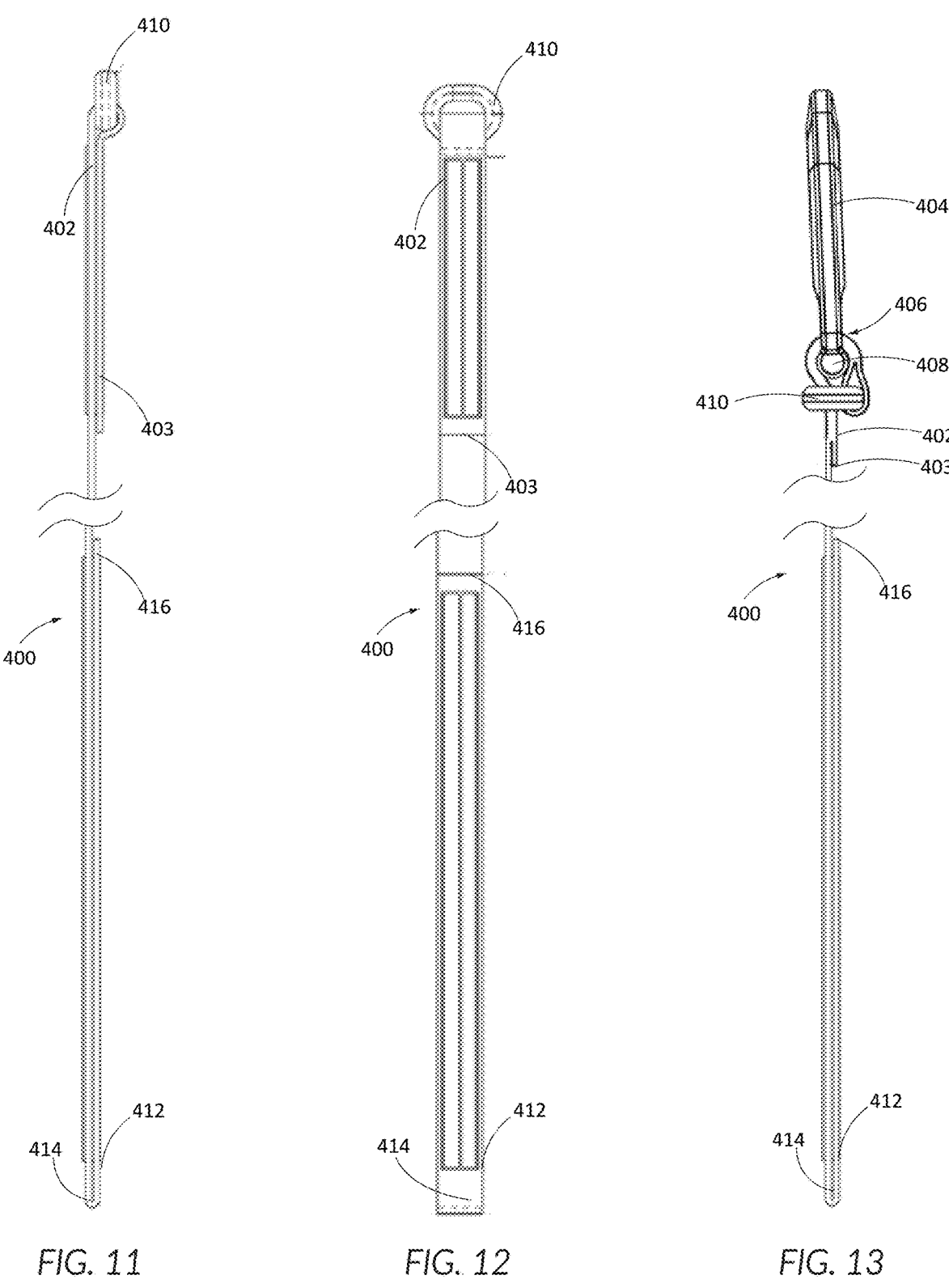
FIG. 11                    FIG. 12                    FIG. 13

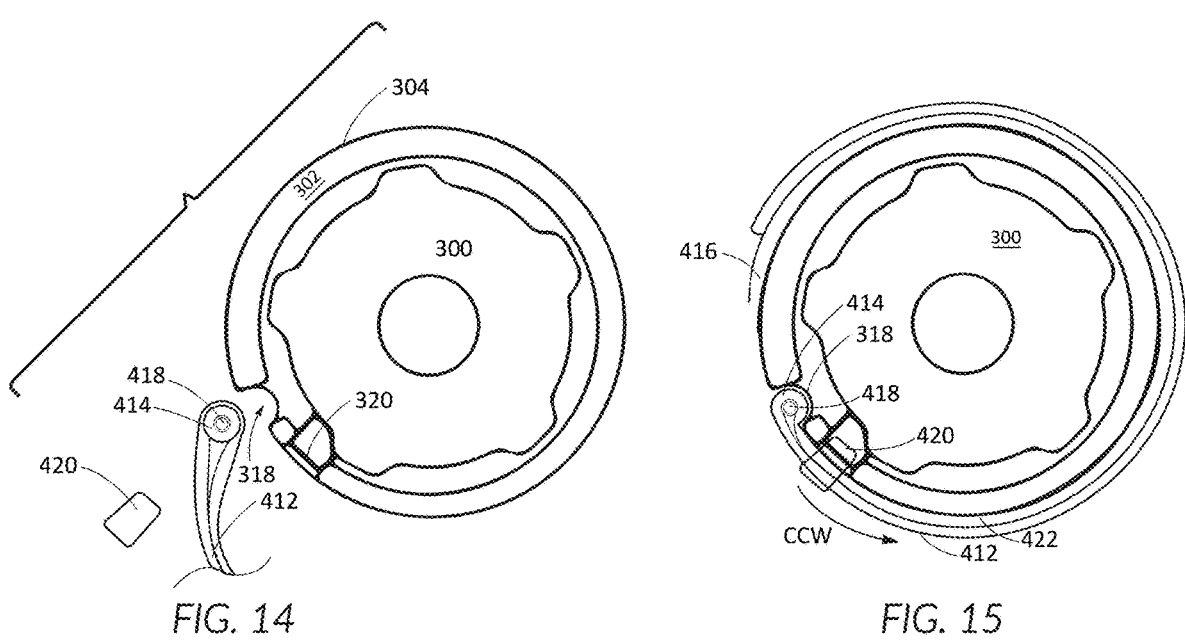
FIG. 14
FIG. 15
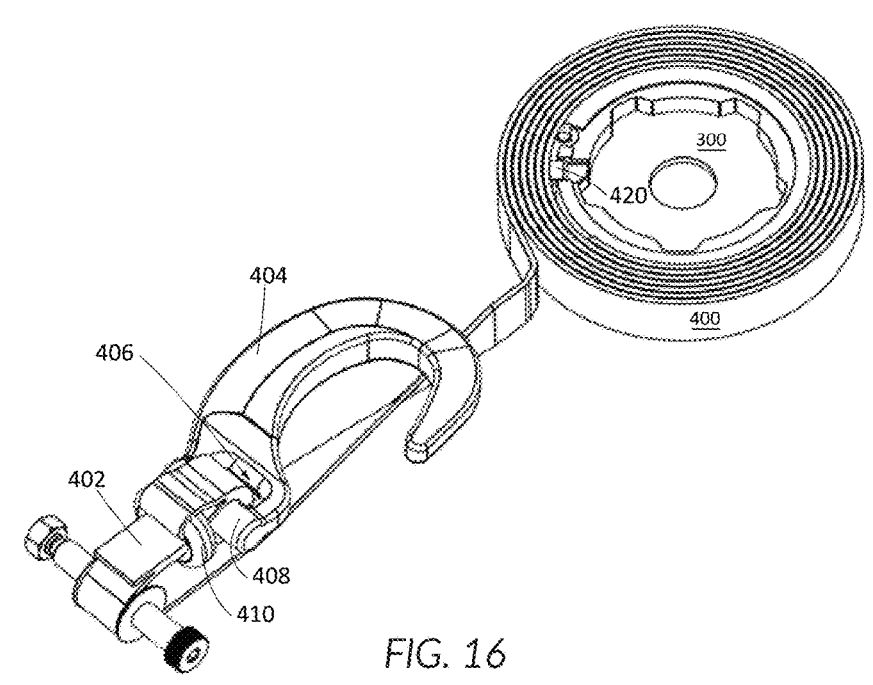
FIG. 16

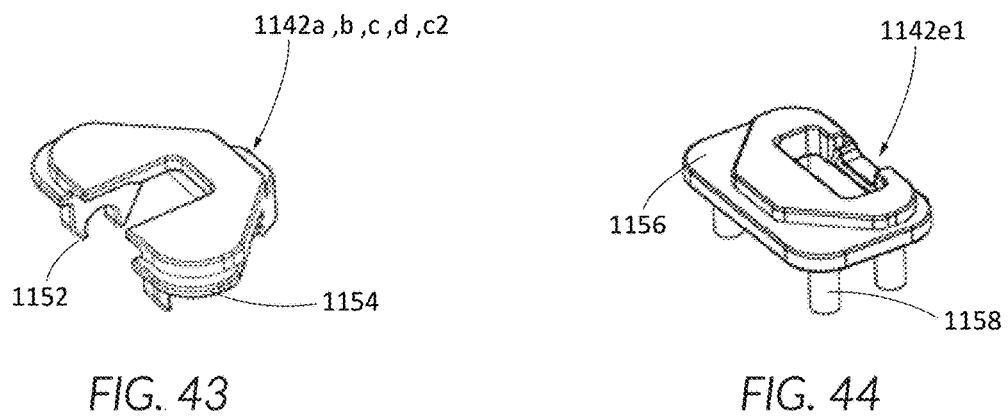
FIG. 43
FIG. 44
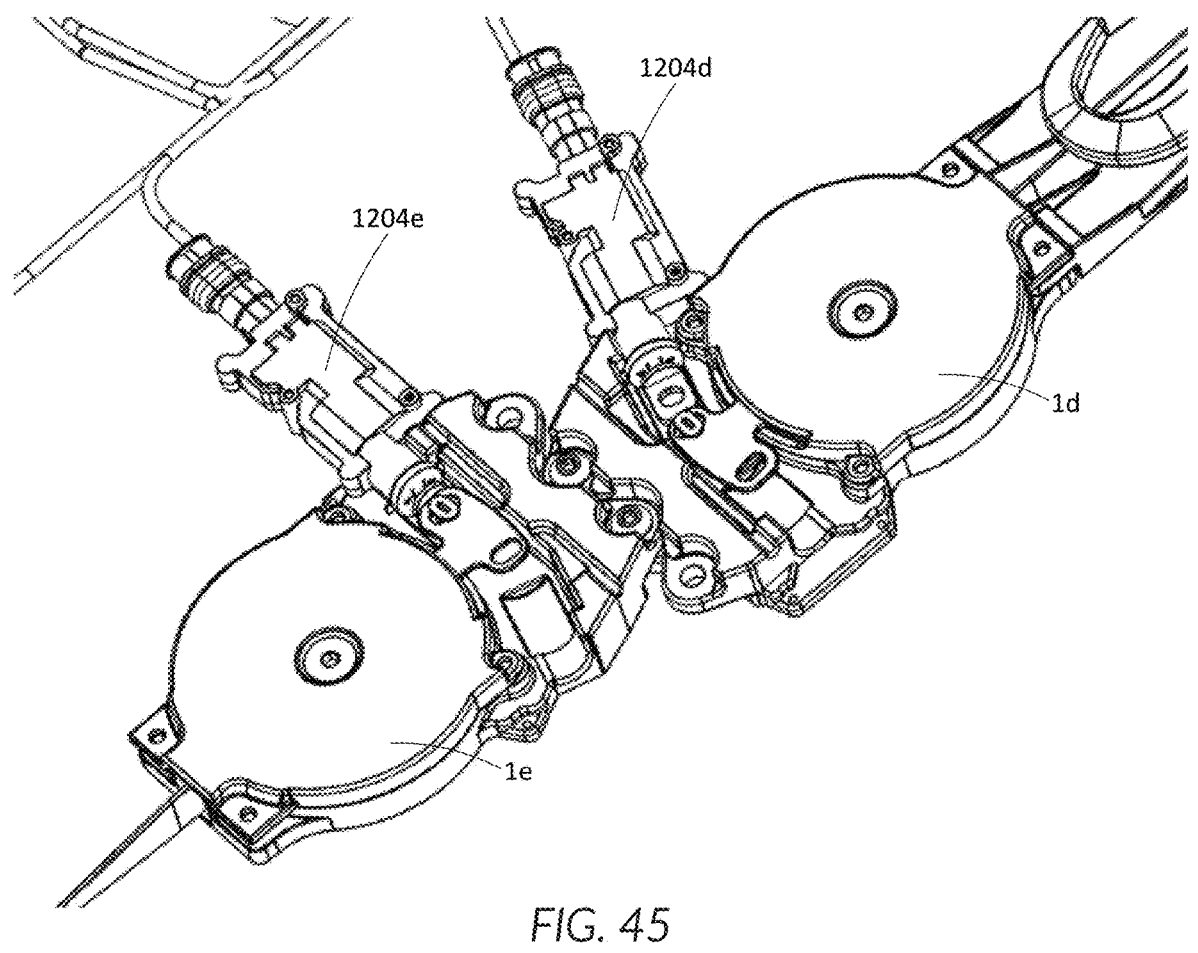
FIG. 45

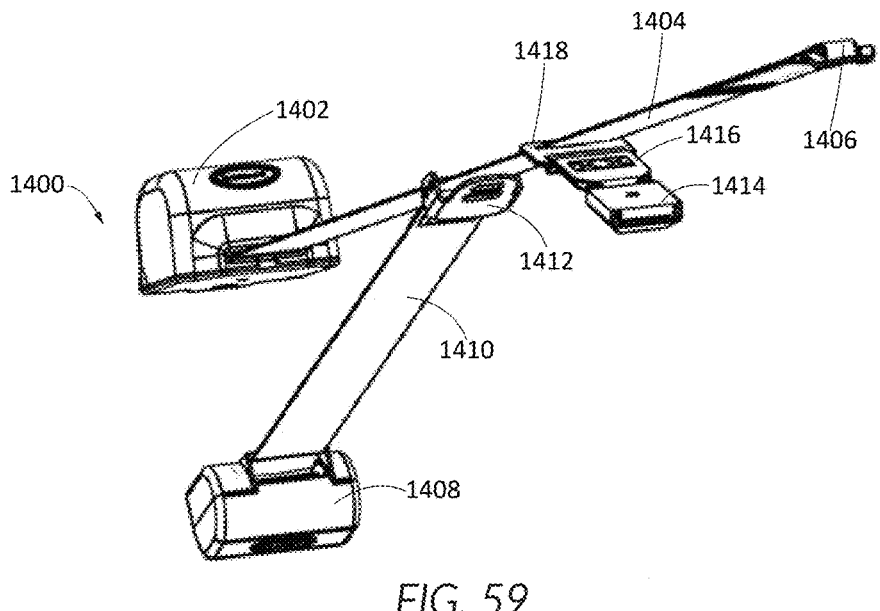
*FIG. 59*
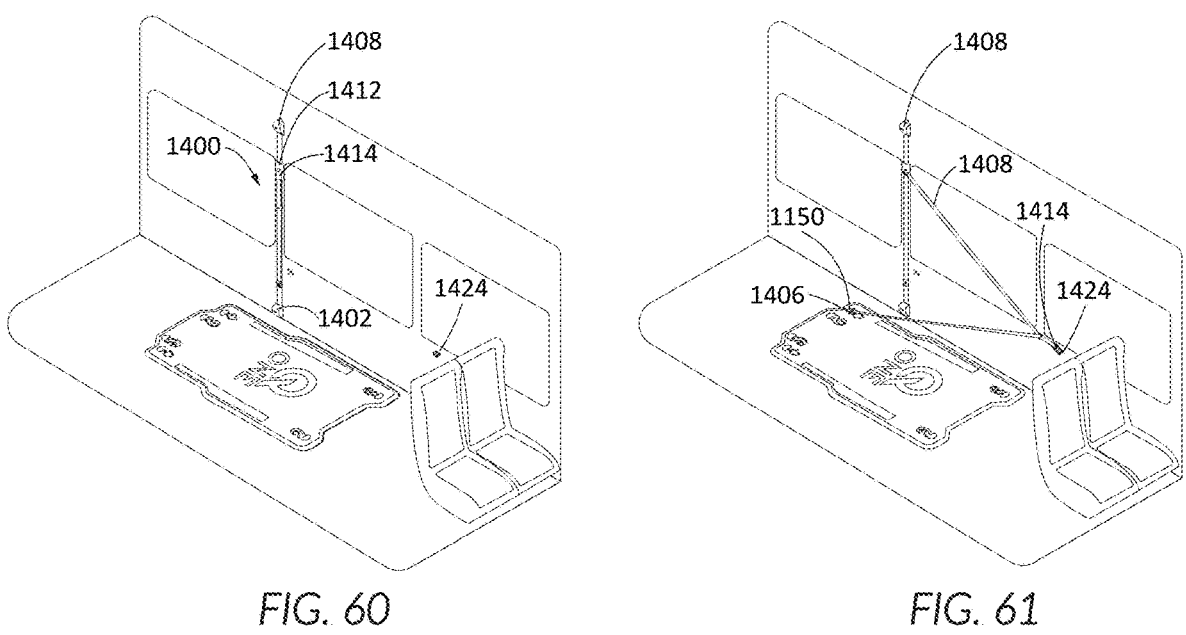
*FIG. 60*                                     *FIG. 61*

THIN PROFILE RETRACTOR APPARATUS AND SYSTEMS

CROSS-REFERENCE TO OTHER APPLICATIONS

This application claims priority to U.S. Provisional Patent Application No. 63/232,804, filed on Aug. 13, 2021 and entitled THIN PROFILE RETRACTOR APPARATUS AND SYSTEMS, which application is incorporated herein by reference. This application also incorporates by reference PCT Patent Application No. PCT/US22/39960, filed contemporaneously herewith on Aug. 10, 2022, entitled THIN PROFILE RETRACTOR APPARATUS AND SYSTEMS.

BACKGROUND

Technical Field

The embodiments described and claimed herein relate generally to wheelchair tiedown and occupant restraint systems (WTORS) and components thereof. More particularly, some embodiments of the present inventions relate to thin profile retractors and retractor components and configurations that permit a thinner profile, while other embodiments relate to thin-profile systems, including drop-in systems comprising a majority of the WTORS components, that include those thin profile retractors.

Background Art

Various wheelchair securement and wheelchair occupant restraint systems are known in the art that permit wheelchair users to secure their wheelchair during motor-vehicle transport. Those systems typically comprise bulky, heavy retractors that either protrude from the floor of a vehicle—and therefore present a tripping hazard for walking passengers or an obstacle for a wheelchair—or must be connected to a floor track after a wheelchair has entered the wheelchair securement area and removed prior to leaving the area.

Some in the wheelchair securement industry have attempted to solve the problem of bulky retractors by integrating the wheelchair securement system below the floor of a vehicle. Those in-floor systems, however, a bulky in and of themselves, which makes installation difficult in common wheelchair transport vehicles. Indeed, installing those known in-floor systems requires cutting large holes through the OEM floor of the vehicle. Aside from this being a laborious task, cutting large holes in the OEM floor obviously may negatively affect the structural integrity of the vehicle.

In summary, it can be said that most prior devices either sit significantly above floor level, where they must be removed to enable the wheelchair passenger to maneuver in the vehicle, or the extend significantly below the OEM vehicle floor, where large holes must be cut therethrough.

SUMMARY OF THE PRESENT EMBODIMENTS

Clearly, the prior art devices have limitations which the present embodiments overcome. Various new embodiments of a retractor apparatus and system are contemplated that solve those limitations, which embodiments comprise combinations of any one or more of the following features or other features described elsewhere in this disclosure, many features of which enable a retractor apparatus and a system comprising those retractor apparatus to substantially fit between the upper plane of the OEM floor and the upper plane of an aftermarket floor (or only slightly there above, i.e., within about ¾" or ½").

A retractor in a wheeled mobility device securement system may have a thin profile. For example, a securement system may be configured to secure a wheeled mobility device in a vehicle, where the vehicle having a floor panel with a bottom surface defining a first plane and an upper surface defining a second plane. The securement system may include at least one retractor, wherein substantially all of the at least one retractor sits above the first plane and no higher than approximately ½" above the second plane. The retractor may include a drum adapted to spool a restraint and to rotate about a drum axis, whereby the drum axis is substantially perpendicular to the second plane. The system may include a guide member for guiding a restraint, wherein the restraint includes a twisted region as the restraint extends from the drum to the guide member; and, a twist angle in the twisted region is greater than 0°. The twist angle may be approximately 90° and a width of the restraint is aligned generally parallel to the second plane. The restraint may have a first length between the drum and the guide member that defines a first restraint longitudinal axis. The restraint may also be adapted to have a second length between the guide member and the wheeled mobility device that defines a second restraint longitudinal axis. An angle between the first restraint longitudinal axis and the second restraint longitudinal axis may be greater than approximately 90° and less than approximately 180°. The angle between the first restraint longitudinal axis and the second restraint longitudinal axis may be between approximately 120° and approximately 150°. A housing may be provided, wherein the housing may include a top panel and a bottom panel. The housing may hold at least one retractor. Substantially all of the housing may sit above the first plane and no higher than approximately ½" above the second plane. The top panel may define a securement floor area for the wheeled mobility device. The thickness of the housing and/or retractor may be less than approximately 2.0", 1.75", 1.5", 1.4", 1.354", 1.2", 1.1", or 1.07".

A retractor drum may be perpendicular to a mounting/adjacent surface. For example, a retractor may be adapted to be secured adjacent a surface of a vehicle. The retractor may include a drum that rotates relative to a retractor frame about a rotational axis, wherein the rotational axis is perpendicular to the surface. The surface may be an upper surface of a floor panel, where the floor panel may have a bottom surface defining a first plane and the upper surface defining a second plane. Substantially all of the drum may sit above the first plane and no higher than approximately ½" above the second plane. The retractor may include a housing that holds the drum. The housing may have a top panel and a bottom panel or, alternatively, a first cover and a second cover. Substantially all of the housing may sit above the first plane and no higher than approximately ½" above the second plane. A guide member may be provided for guiding a restraint. The restraint may include a twisted region as the restraint extends from the drum to the guide member. A twist angle in the twisted region may be greater than 0°, or approximately equal to 90°. A width of the restraint may be aligned generally parallel to the surface after the twisted region. The surface may be a floor surface. A restraint may have a first length between the drum and a guide member that defines a first restraint longitudinal axis. The restraint may also be adapted to have a second length between the guide member and a wheeled mobility device that defines a second restraint longitudinal axis. An angle between the first restraint longitudinal axis and the second restraint longitu-
dinal axis is greater than approximately 90° and less than
approximately 180°. The angle between the first restraint
longitudinal axis and the second restraint longitudinal axis
may be between approximately 120° and approximately
150°.

A locking mechanism may have multiple contacts around
its axis. For example, a retractor may include a locking
assembly for locking a drum relative to a retractor frame.
The drum may be adapted to spool a restraint. The locking
assembly may include a first plurality of teeth rotationally
fixed to the drum and a second plurality of teeth rotationally
fixed to the retractor frame. The first plurality of teeth and
the second plurality of teeth may both be distributed about
a rotational axis of the drum. The locking assembly may
have a plurality of contact points between the first plurality
of teeth and the second plurality of teeth, whereby the
plurality of contact points are distributed about the rotational
axis of the drum. In various embodiments, the locking
assembly may includes at least ten, twenty, thirty, thirty-
nine, forty, fifty, sixty, seventy, or eighty contact points. In
various embodiments, one of the first plurality of teeth and
the second plurality of teeth comprise at least ten, twenty,
thirty, thirty-nine, forty, fifty, sixty, seventy, or eighty teeth
and the other of the first plurality of teeth and the second
plurality of teeth comprise at least thirty, forty, fifty, sixty,
seventy, eighty, ninety, one-hundred, one-hundred-ten, one-
hundred-twenty, one-hundred thirty, one-hundred-forty,
one-hundred-fifty, one-hundred-sixty, one-hundred-seventy,
or one-hundred-eighty teeth.

The locking members may be coaxial. For example, a
retractor may include a locking assembly for locking a drum
relative to a retractor frame. The drum may be adapted to
spool a restraint. The locking assembly may include a first
locking member that is rotationally locked relative to the
drum and a second locking member that is rotationally
locked relative to the retractor frame. The first locking
member may have a first plurality of teeth at least partially
surrounding an axis and the second locking member may
have a second plurality of teeth at least partially surrounding
the same axis. When the first plurality of teeth and the
second plurality of teeth are disengaged, the first locking
member may be rotatable about the axis relative to the
second locking member in both a first rotational direction
and an opposite, second rotational direction. When the first
plurality of teeth and the second plurality of teeth are
engaged, the first locking member may be permitted to rotate
about the axis relative to the second locking member in the
first rotational direction, but may be restricted from rotating
about the axis relative to the second locking member in the
second rotational direction. The first locking member may
be a disc-shaped driver that is rotationally locked with the
drum about the axis. The second locking member may be
disposed on (e.g., integrated with, formed with, attached to,
etc.) the retractor frame.

The teeth of a locking mechanism may engage or extend
in a direction generally parallel to an axis of the drum. For
example, a retractor may include a locking assembly for
rotationally locking a drum about a rotational axis relative to
a retractor frame. The drum may be adapted to spool a
restraint. The locking assembly may include a first plurality
of teeth extending from a first surface in a first direction and
a second plurality of teeth extending from a second surface
in a second direction. The first direction may be opposite the
second direction, and the first direction and the second
direction may be generally parallel with the rotational axis.
The first plurality of teeth and the second plurality of teeth may be engageable to prevent rotation of the drum about the
rotational axis in at least one rotational direction. The first
surface and the first plurality of teeth may be disposed on a
disc-shaped driver that is rotationally locked with the drum
about the rotational axis. The second surface and the second
plurality of teeth may be disposed on the retractor frame.

A friction disc may be provided to push locking mecha-
nisms apart. For example, a retractor may include a locking
assembly for selectively locking and unlocking a drum about
a rotational axis relative to a retractor frame. The drum may
be adapted to spool a restraint. The locking assembly may
comprise a first plurality of teeth associated with the drum,
a second plurality of teeth associated with the retractor
frame, and a clutch member moveable from a disengaged
position to an engaged position between the first plurality of
teeth and the second plurality of teeth. The clutch member
may be configured to urge at least one of the first plurality
of teeth and the second plurality of teeth away from the other
of the first plurality of teeth and the second plurality of teeth.
A first cam member and a second cam member may also be
provided, where the first cam member and second cam
member may cooperate as the clutch member is moved from
the disengaged position to the engaged position to push the
clutch member against the at least one of the first plurality
of teeth and the second plurality of teeth. The clutch member
may be positioned to engage with a tip of the at least one of
the first plurality of teeth and the second plurality of teeth.
A friction disc may be provided that defines the clutch
member. The friction disc may be coaxial with the rotational
axis of the drum. The friction disc may be configured to
rotate between the disengaged position and the engaged
position. At least one rotation limiter may be provided to
limit rotation of the friction disc between the disengaged
position and the engaged position. The first cam member and
second cam member may cooperate as the friction disc is
moved from the disengaged position to the engaged position
to push the clutch member against the at least one of the first
plurality of teeth and the second plurality of teeth. The
friction disc may include a ring portion, at least one spring
member, and the clutch member, whereby the at least one
spring member may interconnect the ring portion with the
clutch member. The ring portion, the at least one spring
member, and clutch member may lie substantially in a single
plane in the disengaged position. Further, the first cam
member and second cam member may cooperate to push the
clutch member out of the single plane as the friction disc is
moved from the disengaged position to the engaged posi-
tion. The first cam member may be provided as a first ramp
and the second cam member may be provided as a second
ramp. The first ramp may be formed on a surface of the
retractor frame and the second ramp may be formed on the
clutch member. The friction disc may define a hub that
engages with a spindle defined by at least one of the first
plurality of teeth and the second plurality of teeth. For
instance, the spindle may be defined by a radially outward
directed edge of the at least one of the first plurality of teeth
and the second plurality of teeth. The retractor frame may
comprise at least a first cover and a second cover, while the
friction disc may lies in substantially a single plane and
generally flush adjacent an inside surface of one of the first
cover and the second cover in the disengaged position. A
first cam member and a second cam member may cooperate
as the friction disc is moved from the disengaged position to
the engaged position to push the clutch member away from
the inside surface and against the at least one of the first
plurality of teeth and the second plurality of teeth.

The core of a drum may hold a locking member. For example, a retractor may comprise a drum and a locking member supported by a retractor frame. The drum may include a ring portion, where the ring portion defines a peripheral outer surface for spooling a restraint. The ring portion may surround an at least partially open-volume core, with the locking member being substantially disposed within the core. The locking member may be configured to engage with a corresponding locking member to rotationally lock the drum in at least a first rotational direction. Alternatively, a retractor may include a drum, a driver, and an axial spring supported by a retractor frame. The drum may include a ring portion, where the ring portion defines a peripheral outer surface for spooling a restraint. The ring portion may surround an at least partially open-volume core, where the driver and axial spring are individually or both at least partially, substantially, or wholly disposed within the core. The driver may engage with the drum whereby the driver and drum are rotationally locked together about an axis of the drum. The driver may biased by the axial spring in one direction along the axis of the drum. The driver may be biased by the axial spring to a first position and may be moveable to a second position where the axial spring is compressed, whereby the driver engaging with a locking structure in the first position to prevent rotation of the drum. The drum may include a flange in the at least partially open-volume core, wherein the axial spring engages between the flange and the driver to bias the driver away from the flange. The driver may be biased by the axial spring to a first position away from the flange and may be moveable to a second position adjacent the flange where the axial spring is compressed, whereby the driver engaging with a locking structure in the first position to prevent rotation of the drum. The axial spring may take the form of a coiled metal wire. The driver may be disc-shaped. The driver may include a first locking member that is engageable with a second locking member disposed on the retractor frame to prevent rotation of the drum about the axis in at least a first rotational direction. The first locking member may include a plurality of locking structures that extend from a surface of the driver, the surface of the driver being normal to the axis. The second locking member may include a plurality of corresponding locking structures that extend from a surface of the retractor frame, the surface of the retractor frame being normal to the axis.

The core of a drum may contain a rotational spring. For example, a retractor may include a drum and a rotational biasing member supported by a retractor frame. In turn, the drum may have a ring portion that defines a peripheral outer surface for spooling a restraint. Additionally, the ring portion may surround an at least partially open-volume core. The rotational biasing member may be at least partially, substantially, or wholly disposed within the core. The rotational biasing member may also engage between the retractor frame and the drum to rotationally bias the drum in a first direction. Further yet, the rotational biasing member may be a coiled metal tape engaged at a first end with the retractor frame and at a second end with the drum.

A knot-like connection may be provided between the restraint and a hook. For example, a retractor may include a restraint with a connection to a connector at a free end of the restraint. The free end of the restraint may be configured with a doubled over restraint portion defined by a distal end of the restraint being doubled over and attached to restraint after extending through a ring. The connection between the restraint and the connector may be formed by inserting a proximal end of the restraint through an eye of the connector and then through the ring, and then pulling the proximal end tight. In addition, the doubled over restraint portion may extend through and past the ring after the connection is made. The restraint may be a belt with a width of less than approximately 1 inch. In further embodiments, the width may be approximately ¾ inch or less. The doubled over restraint portion may be formed at least partially by sewing the restraint. Additionally or alternatively, the doubled over restraint portion may be formed at least partially by gluing the restraint. The eye of the connector may include a bearing surface for contact with the restraint. The bearing surface could reduce friction with and/or eliminate or reduce point loads on the restraint. The bearing surface may be defined by a round bar. The connector may be a hook. The doubled over restraint portion could have a length of at least approximately 2 inches. In other embodiments, the doubled over restraint portion could have a length of approximately 5.5 inches or greater.

A strong connection may be made between the restraint and the drum. For example, a retractor may include a restraint with a connection to a drum at a proximal end of the restraint. The proximal end of the restraint could be configured with a doubled over restraint portion. The doubled over restraint portion could be defined by a terminal end of the restraint being doubled over and attached to the restraint. The proximal end may secured to the drum, whereafter the restraint may be coiled around the drum. The doubled over restraint portion may define an open hoop that receives a rigid pin. The open hoop may be received by a pocket formed in a peripheral outer surface of the drum. A spring clip or other connection member may be disposed adjacent the open hoop and pocket to secure the restraint to the peripheral surface of the drum. In one embodiment, the spring clip may wrap around and secure the restraint to the peripheral outer surface of the drum. The spring clip may be generally C-shaped and/or engage with one or a pair of inwardly facing shoulders adjacent the peripheral outer surface of the drum. The doubled over restraint portion may extend at least 360° around the drum, whereby the doubled over restraint portion is at least partially doubled over itself. An adhesive may be applied in a region where the doubled over restraint portion is at least partially doubled over itself. In other embodiments, the doubled over restraint portion may extend at least 630° around the drum. An adhesive may be applied in a region where the doubled over restraint portion contacts the outer peripheral surface of the drum. The doubled over restraint portion may have a length of at least approximately 5 inches. In other embodiments, the doubled over restraint portion may have a length of approximately 11 inches or greater. The doubled over restraint portion may be formed at least partially by sewing the restraint. Additionally or alternatively, the doubled over restraint portion may be formed at least partially by gluing the restraint.

The drum may be snail shaped. For example, a retractor may include a drum with a peripheral outer surface for spooling a restraint. The peripheral outer surface may be a radius at a first side of a restraint origination point that is less than the radius at a second side of the restraint origination point. The radius of the peripheral outer surface may gradually increases as the peripheral outer surface extends from the first side of the restraint origination point to the second side of the restraint origination point. The peripheral outer surface may be generally snail shaped. A difference in the radius of peripheral outer surface at the first side and the second side of the restraint origination point may be approximately or generally equal to the thickness of the first pass of the restraint around the drum.

The restraint may twist as it extends from the drum to a webbing guide. For example, a retractor may include a drum for spooling a restraint and a guide member for guiding a free end of the restraint. The restraint may take the form of a belt having a width. The belt may includes a twisted region as the restraint extends from the drum to the guide member, where a twist angle in the twisted region is greater than 0°, greater than approximately 15°, greater than approximately 30°, greater than approximately 45°, greater than approximately 60°, greater than approximately 75°, or approximately 90°. The twist angle may also be within a range between any of the previously mentioned angles or between those previously-mentioned angles and approximately 90°. Alternatively, a retractor may include a drum for spooling a restraint and a guide member for guiding a free end of the restraint. The restraint may extend from the drum to the guide member and may have a width that defines a first restraint lateral axis at the drum and a second restraint lateral axis at the guide member. The first restraint lateral axis may be non-parallel with the second restraint lateral axis. An angle between the first restraint lateral axis and the second restraint lateral axis may be greater than approximately 15°, greater than approximately 30°, greater than approximately 45°, greater than approximately 60°, greater than approximately 75°, or approximately 90°. That angle may also be within a range between any of the previously mentioned angles or between those previously-mentioned angles and approximately 90°. The guide member may be a roller. The retractor may be installed in a vehicle, wherein the first restraint lateral axis is approximately vertical relative to the vehicle. In addition, the second restraint lateral axis may be approximately horizontal relative to the vehicle. In another alternative, a retractor may include a drum for spooling a restraint and a guide member for guiding a free end of the restraint. The restraint may have a length between the drum and the guide member that defines a restraint longitudinal axis. The guide member may have a guide axis. The restraint longitudinal axis may be non-parallel with the guide axis. The guide member may be a roller, while the guide axis may be a rotational axis of the roller. An angle between the restraint longitudinal axis and the guide axis may be greater than approximately 15°, greater than approximately 30°, greater than approximately 45°, greater than approximately 60°, greater than approximately 75°, or approximately 90°. That angle may also be within a range between any of the previously mentioned angles or between those previously-mentioned angles and approximately 90°. The retractor may be installed in a vehicle, wherein the restraint longitudinal axis is approximately horizontal relative to the vehicle. In addition, the drum may have a rotational axis that is approximately vertical relative to the vehicle.

A restraint guide may redirect the restraint back toward and/or over the drum. For example, a retractor may be provided for securing an object in a vehicle, where the retractor may include a drum for spooling a restraint and a guide member for guiding a free end of the restraint. The restraint may have a first length between the drum and the guide member that defines a first restraint longitudinal axis and may be adapted to have a second length between the guide member and the object that defines a second restraint longitudinal axis. An angle between the first restraint longitudinal axis and the second restraint longitudinal axis may be greater than approximately 90° and less than approximately 180°, between approximately 120° and approximately 150°, between approximately 135° and approximately 150°, or between approximately 120° and 140°.

A bridge for the restraint may create downward forces to prevent the retractor from folding during a loading event. For example, a retractor may include a frame with an underside adapted to rest on a supporting surface in an installed configuration, a drum for spooling a restraint, and a guide member for guiding the restraint. The frame may define a fixed free column between at least one set of points selected from: (a) an anchor point and the drum; (b) the guide member and the drum; and (c) the anchor point and the guide member. The restraint may have a length between the one set of points that defines a force vector path. The fixed free column may have a neutral axis, where the neutral axis is above the force vector path relative to the underside from the frame. Alternatively, a retractor may include a frame with an underside adapted to rest on a supporting surface in an installed configuration, a drum for spooling a restraint, and a guide member for guiding the restraint. The frame may define a fixed free column between the guide member and the drum, where the restraint has a length between the guide member and the drum that defines a force vector path. The fixed free column may have a neutral axis, where the neutral axis is above the force vector path relative to the underside from the frame. In that respect, a tension applied to the restraint when the drum is in a locked configuration tends to force the drum toward the supporting surface.

The retractor may comprise covers that are designed to resist torque therebetween. For example, a retractor may include a frame comprising at least two parts, where the two parts engage with each other to transfer a torque from the retractor internals through the two parts and then to a support surface. For instance, a frame for a retractor spool may comprise at least a first cover and a second cover, and a connection between the first cover and the second cover. The first cover may include a locking member which engages with a complimentary locking member associated with the spool to prevent rotation of the spool in at least one rotational direction. The second cover may be anchored to a support surface not through the first cover, whereby a pull force on a restraint wound around the spool creates a torque that is transferred to the support surface through the connection between the first cover and the second cover. The connection may comprise a plurality of fasteners securing the first cover to the second cover through a plurality of corresponding aperture sets disposed on each of the first cover and the second cover for receiving the plurality of fasteners, wherein the fasteners and corresponding aperture sets cooperate to transfer the torque and resist rotation of the first cover relative to the second cover. The corresponding aperture sets may be distributed around a periphery of the spool. The connection may comprise a plurality of corresponding registration member sets disposed on each of the first cover and the second cover, wherein each of the corresponding registration member sets engage to transfer the torque and resist rotation of the first cover relative to the second cover. The plurality of registration member sets may be distributed about a periphery of the spool. The plurality of registration member sets may comprise a male member on one of the first cover and the second cover that is received in a female member on the other of the first cover and the second cover. The first cover and the second cover may include an opening for passing a restraint leaving the spool, the opening defined at least partially by at least one pair of corresponding side walls disposed on each of the first cover and the second cover, wherein the at least one pair of corresponding side walls engage to transfer the torque and resist rotation of the first cover relative to the second cover. The pair of corresponding side walls may define a pair of corresponding engaging faces orientated at an angle to a reference plane, the reference plane being normal to the axis, wherein the pair of corresponding engaging faces engage to transfer the torque and resist rotation of the first cover relative to the second cover. The pair of corresponding side walls may include at least one pair of corresponding circular wall portions and at least one pair of corresponding diverging walls sections that diverge from the pair of corresponding circular wall portions, wherein the pair of corresponding diverging wall sections overlap to transfer the torque and resist rotation of the first cover relative to the second cover. The frame may include a fastener securing the top cover to the bottom cover in a region central to the spool, whereby the fastener is adapted to resist a spreading force tending to increase a distance between a top plate of the top cover and a bottom plate of the bottom cover.

The locking members may be designed to engage and disengage in a direction where they will be minimally influenced by the anticipated loads of an accident. For example, a retractor may be installed in a vehicle. The retractor may comprise a locking assembly for rotationally locking and unlocking a drum about a rotational axis relative to a retractor frame. The drum may be adapted to spool a restraint. The locking assembly may comprise a first locking member associated with the drum and a second locking member associated with the retractor frame. At least one of the first locking member and the second locking member may be moveable in a linear upward and downward direction relative to the vehicle for engaging and disengaging, respectively or non-respectively, with the other of the first locking member and the second locking member, whereby the locking assembly is not susceptible to any of a forward excursion force, a rearward excursion force, and a sideward excursion force disengaging the locking assembly. Alternatively, at least one of the first locking member and the second locking member may be moveable in a linear leftward and rightward direction relative to the vehicle for engaging and disengaging, respectively or non-respectively, with the other of the first locking member and the second locking member, whereby the locking assembly is not susceptible to either of a forward excursion force and a rearward excursion force disengaging the locking assembly. Alternatively, a retractor may include a locking assembly for rotationally locking and unlocking a drum about a rotational axis relative to a retractor frame. The drum may be adapted to spool a restraint. The locking assembly may comprise a first locking member associated with the drum and a second locking member associated with the retractor frame. At least one of the first locking member and the second locking member may be moveable in a linear direction for engaging and disengaging, respectively or non-respectively, with the other of the first locking member and the second locking member, whereby the retractor can be installed in a vehicle in an optimal configuration whereby the locking assembly will not be susceptible to at least one of a forward excursion force, a rearward excursion force, and a sideward excursion force disengaging the locking assembly.

Each wheelchair tiedown and occupant restraint may be independently anchored. For example, a wheelchair securement system may include a housing holding at least a first retractor module with a first anchor point for securement to a vehicle and a second retractor module with a second anchor point for securement to the vehicle. The first anchor point and second anchor point may provide independent load paths for each of the first retractor module and the second retractor module which substantially bypass the housing. The housing may be formed from a bottom panel and a top panel, and the bottom panel and top panel may be thermoformed plastic. At least the bottom panel may be incidentally secured to the vehicle at the first anchor point and the second anchor point.

The shape of a housing for a system may include a recessed area for installation adjacent a vehicle wheel well. For example, a wheelchair securement system may include a housing holding a plurality of wheelchair securements. The housing may define an upper floor surface for supporting a wheelchair. The housing may have at least one recessed area on at least one of a first side and a second side of the housing for receiving at least one of a first wheel well and a second wheel well of a vehicle. In that respect, a first width at a first end of the upper floor surface may be greater than a second width at a second end of the upper floor surface. At least one of a first side and the second side of the housing may define a generally stepped surface. The at least one recessed area may include a first recessed area on the first side of the housing for receiving the first wheel well of the vehicle and a second recessed on the second side of the housing for receiving the second wheel well of the vehicle. The two wheelchair securement systems may be installed in a vehicle between the first wheel well and second wheel well of the vehicle, with the first recessed area of the first wheelchair securement system receiving the first wheel well and the second recessed area of the second wheelchair securement system receiving the second wheel well.

The housing of a system may include nesting features on front and rear sides (or left and right sides) to allow them to be closely stacked together front to back or side to side. For example, a wheelchair securement system may include a housing holding at least one of a left front tiedown and a right front tiedown and at least one of a left rear tiedown and a right rear tiedown. The housing may have a front end, a rear end, a left side, a right side, and an upper floor surface for supporting a wheelchair. The front end may have a recessed portion in a front central region wherein the at least one of the left front tiedown and the right front tiedown extend from the upper floor surface each at one of the left side and right side of the recessed portion. Further, the rear end may have a projected portion in a rear central region wherein the at least one of the left rear tiedown and the right rear tiedown extend from the upper floor surface at the projected portion. The system may include both the left front tiedown and the right front tiedown and both the left rear tiedown and the right rear tiedown. In that case, the left front tiedown may extend from the upper floor surface at the left side of the recessed portion, the right front tiedown may extend from the upper floor surface at the right side of the recessed portion, and the left rear tiedown and the right rear tiedown may extend from the upper floor surface at the projected portion. Two wheelchair securement systems may be installed in a vehicle with the projected portion of the first wheelchair securement system being received in the recessed portion of the second wheelchair securement system.

The housing for the system may include a water resistant edge that resists water entering the housing and/or getting below the housing. For example, a wheelchair securement system may include a housing holding at least one wheelchair securement. The housing may a bottom surface adapted to rest on a top of an OEM vehicle floor, a side surface adapted to sit adjacent to an edge of an aftermarket floor that rests on top of the OEM vehicle floor, and an overhang that extends from the side surface and is adapted to rest on a top surface of the aftermarket floor. The overhang may be downwardly biased and may be adapted to contact the top surface of the aftermarket floor. The overhang may be adapted to dig into the top surface of the aftermarket floor when the housing is secured to the vehicle. The overhang may be adapted to prevent water intrusion below the housing. The overhang may be adapted to prevent water intrusion into the housing. The overhang may extend substantially around a perimeter of the housing. The housing may include a first panel and a second panel, and the overhang is defined by both the first panel and the second panel. The first panel and the second panel may nest at the overhang to prevent water intrusion therebetween. The first panel and the second panel may angle downward at the overhang.

Further forms, objects, features, aspects, benefits, advantages, and embodiments will become apparent from the detailed description and drawings provided herewith.

BRIEF DESCRIPTION OF THE SEVERAL VIEWS OF THE DRAWINGS

These and other features, aspects, objects, and advantages of the embodiments described and claimed herein will become better understood upon consideration of the following detailed description, appended claims, and accompanying drawings.

FIG. 8 is first perspective view of a drum of the retractor module;

FIG. 9 is a second perspective view of the drum of the retractor module in combination with a rotational spring;

FIG. 10 is a second perspective view of the bottom cover of the retractor module in combination with the rotational spring;

FIG. 11 is a first side view of a restraint of the retractor module;

FIG. 12 is a first top view of the restraint of the retractor module;

FIG. 13 is a second side view of the restraint of the retractor module;

FIG. 14 is first top view of the drum of the retractor module, in combination with the proximal end of the restraint;

FIG. 15 is a second top view of the drum of the retractor module, in combination with the proximal end of the restraint;

FIG. 16 is a third perspective view of the drum of the retractor module, in combination with the restraint and a roller;

12

Figure 20:
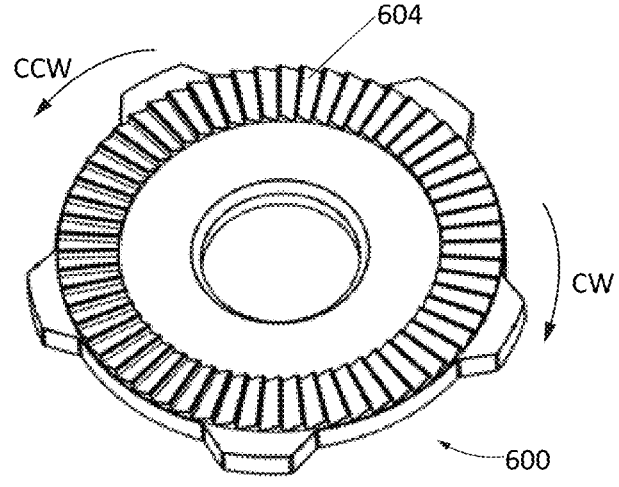
Figure 21:
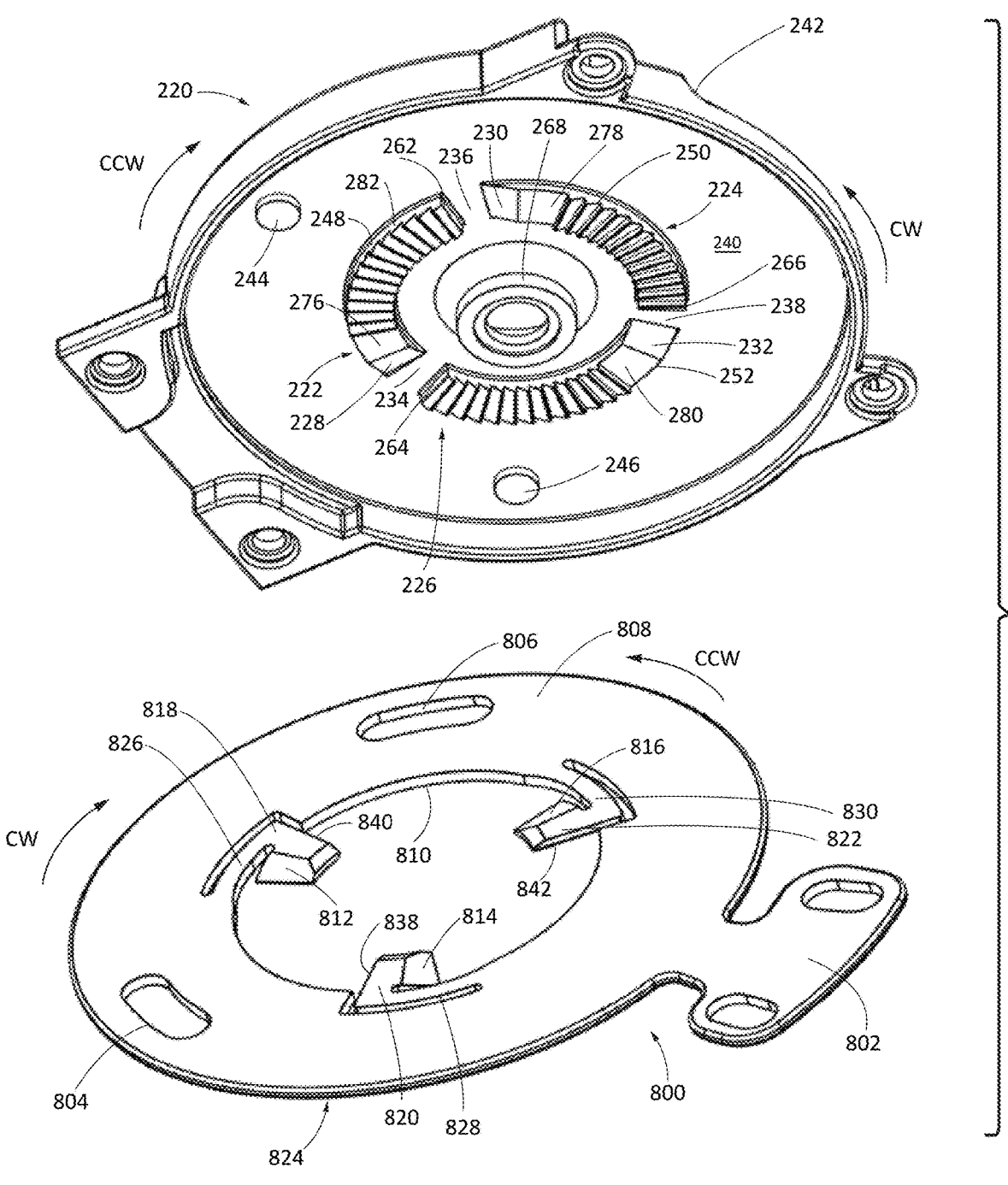
Figure 22:
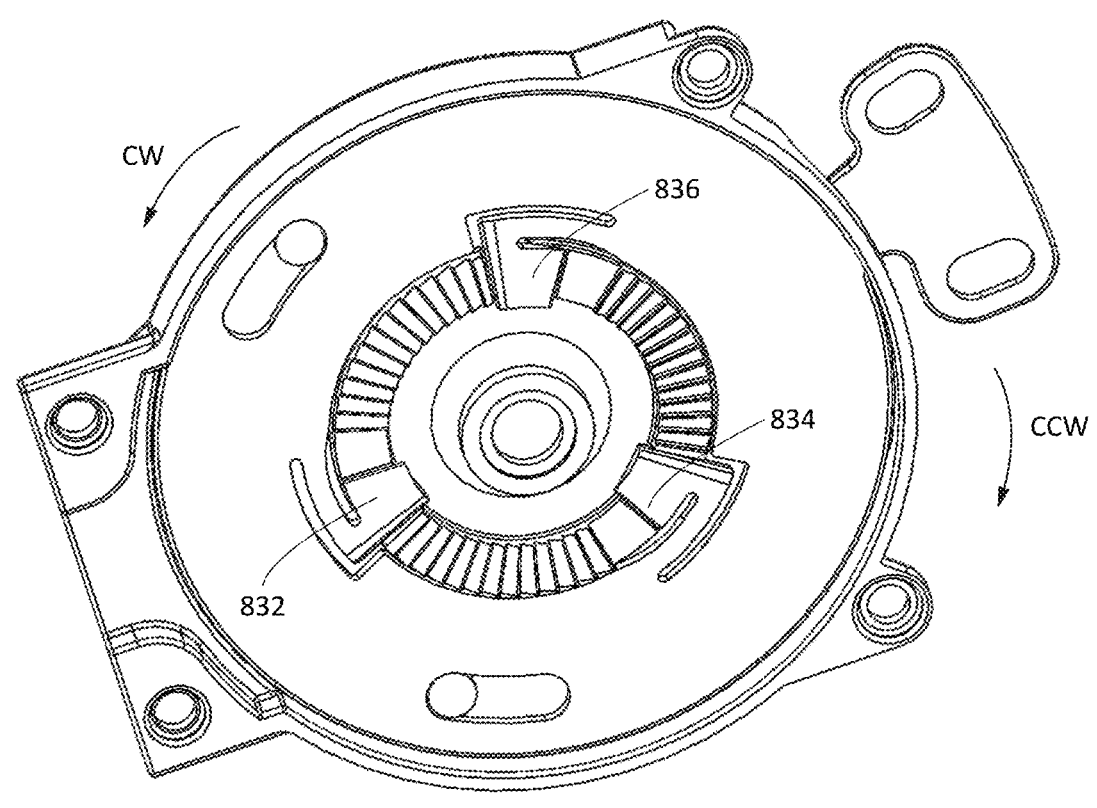
Figure 23:
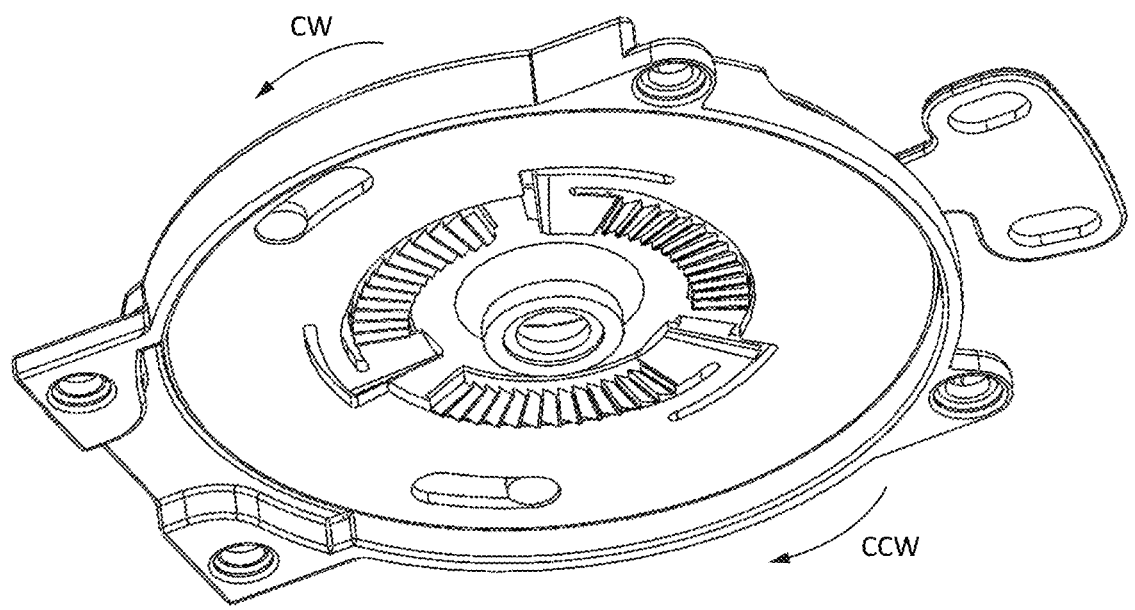
Figure 24:
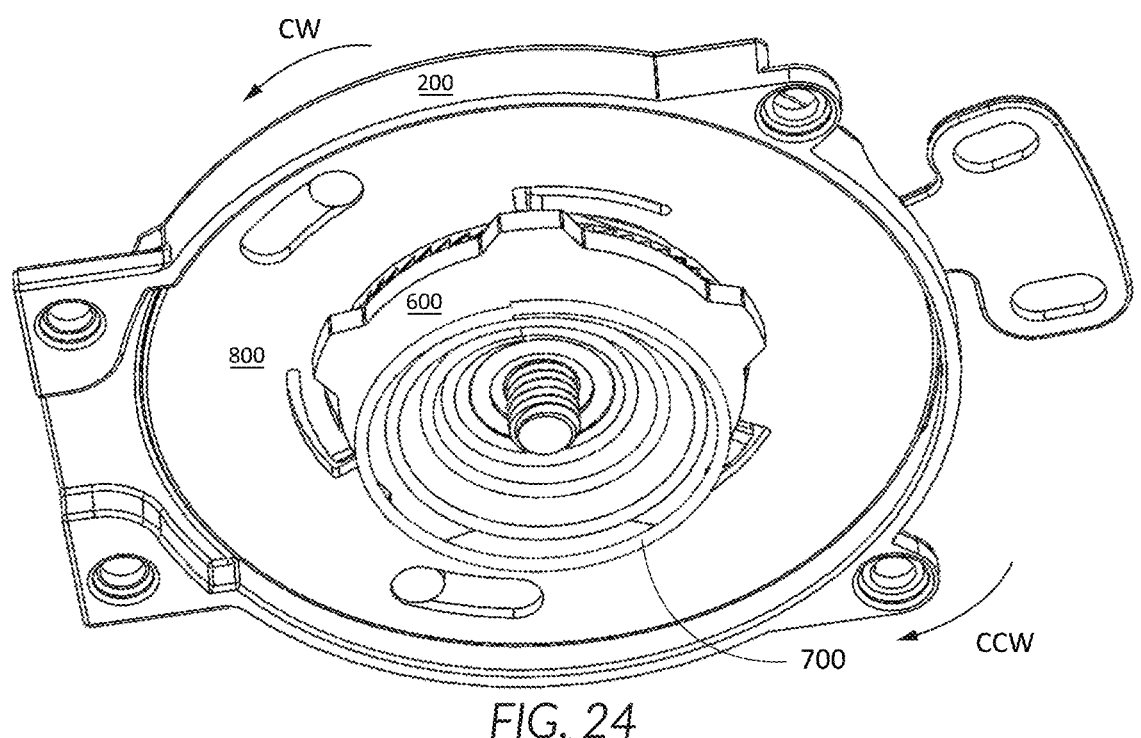
Figure 25:
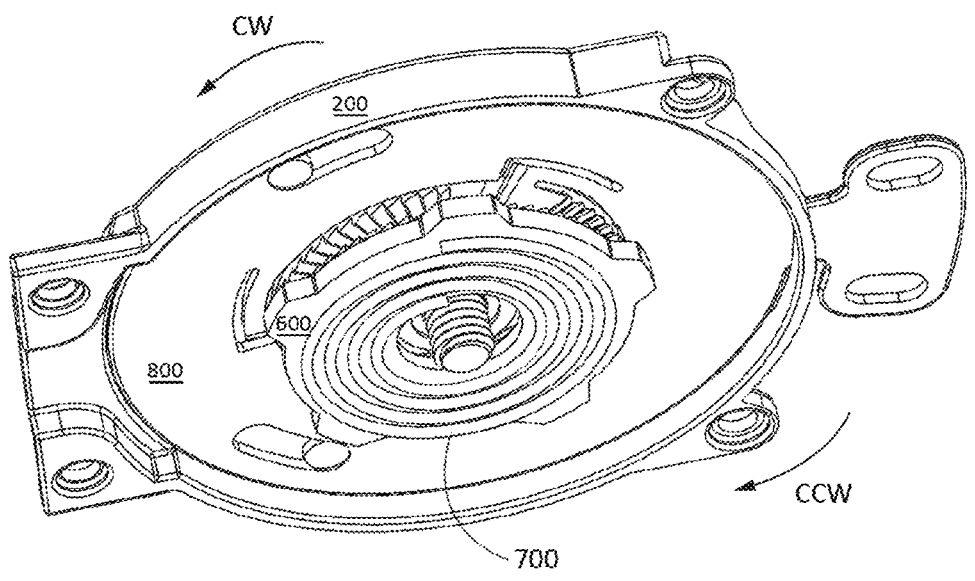
Figures 26, 27:
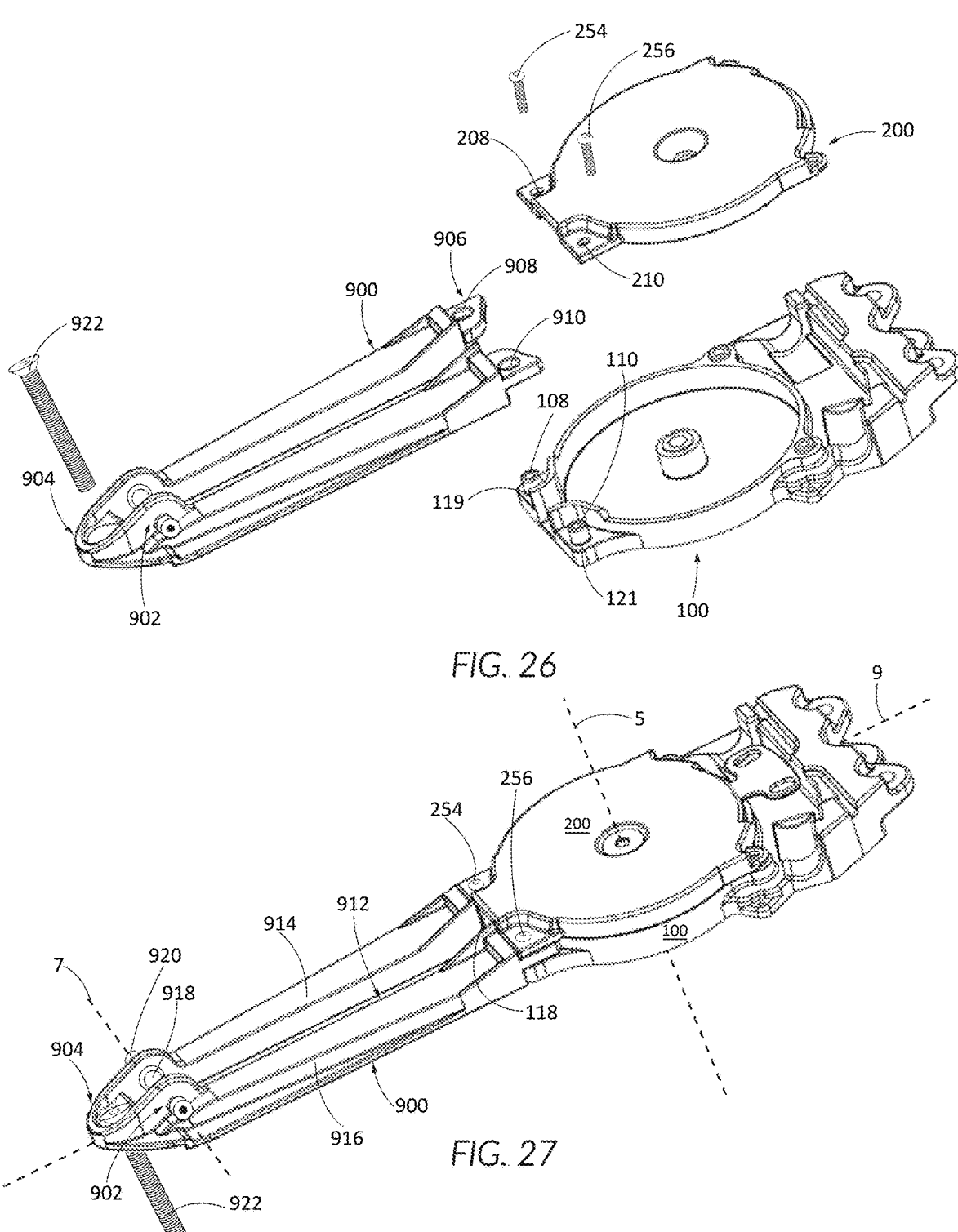
Figures 28, 29:
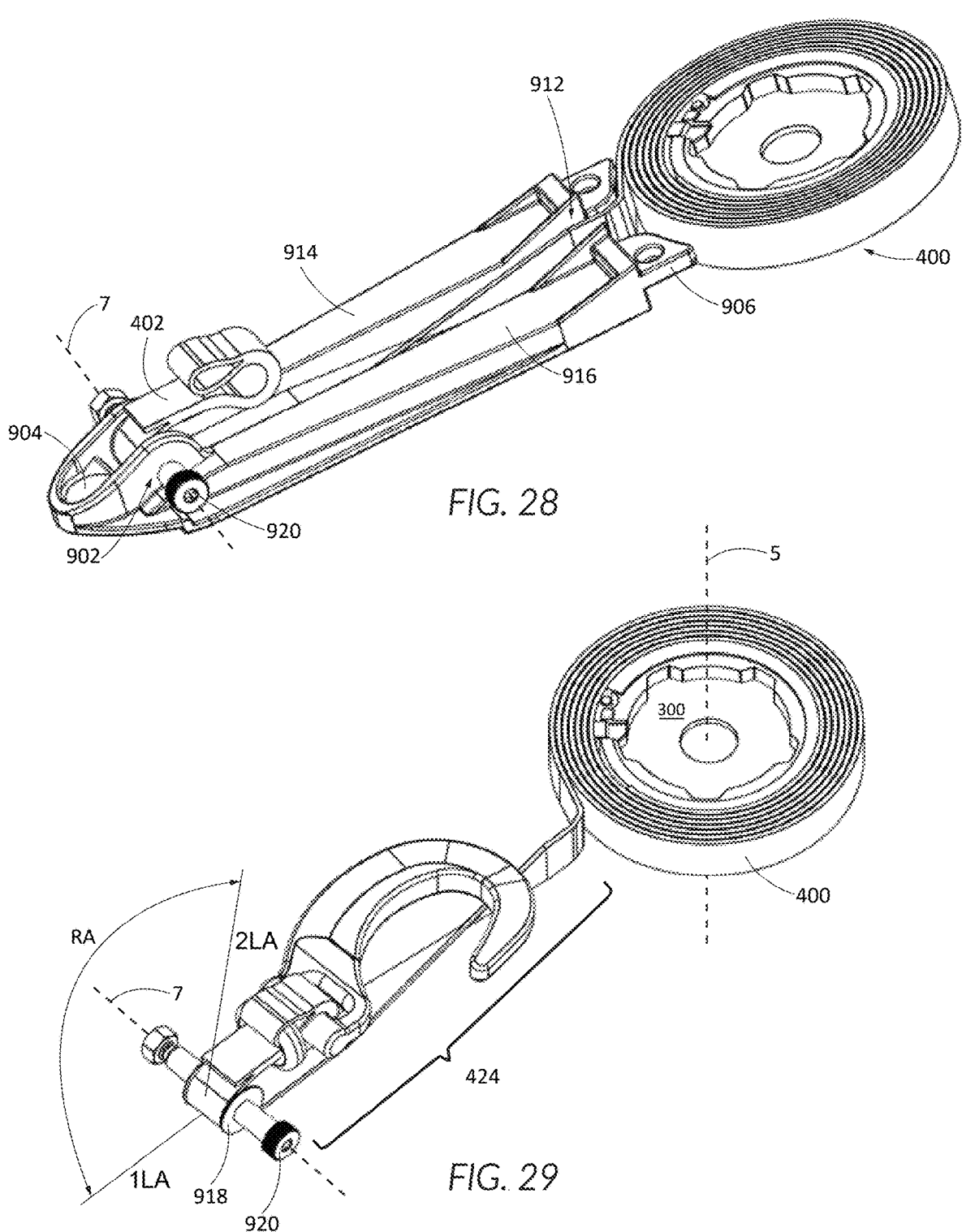
Figures 30, 31, 32, 33, 34:
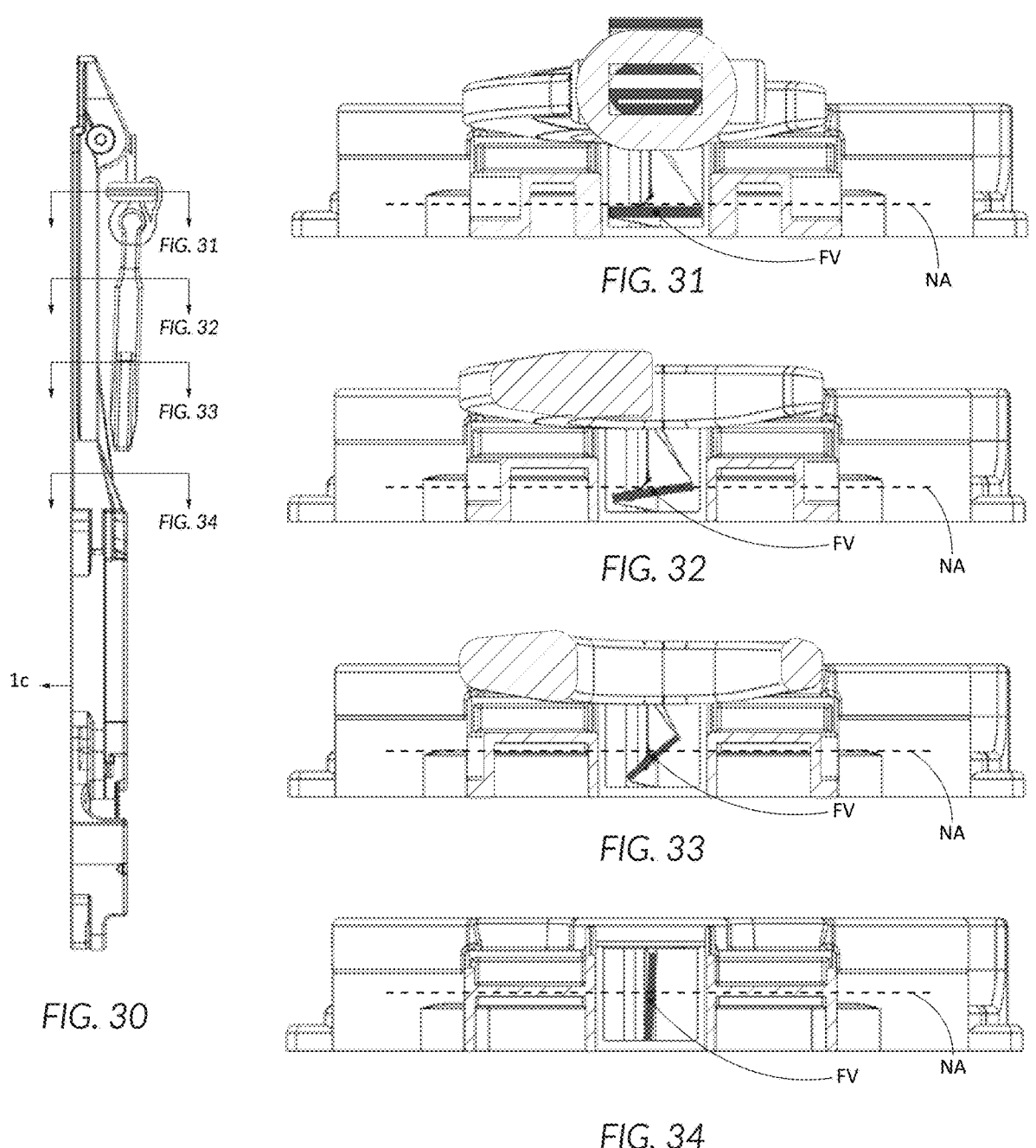
Figure 35:
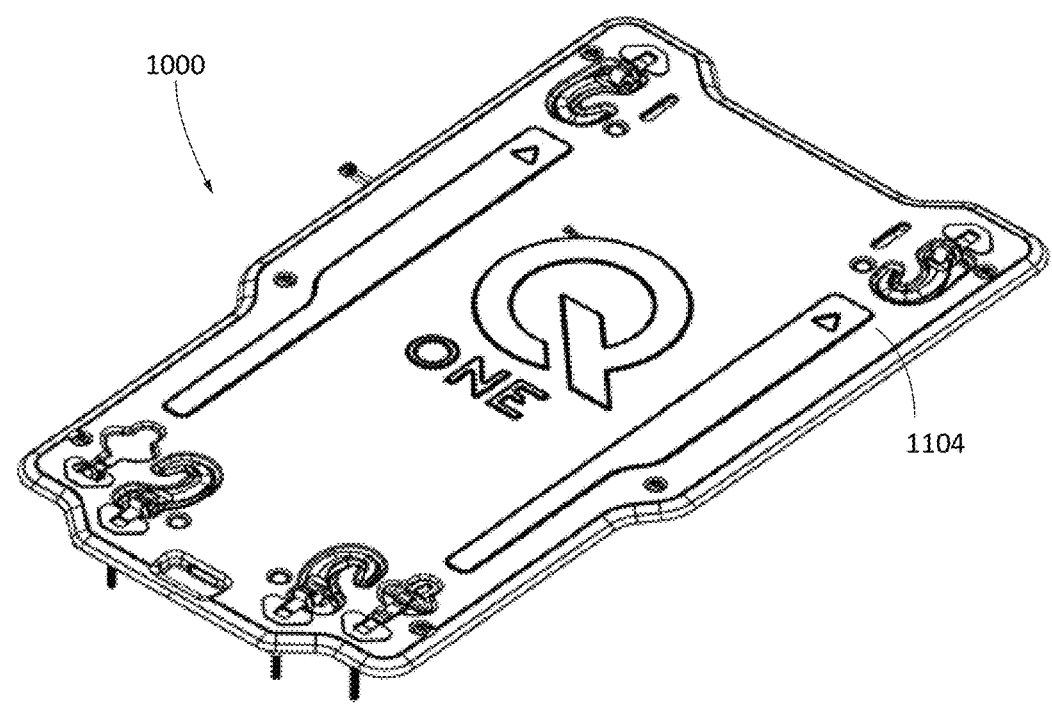
Figure 36:
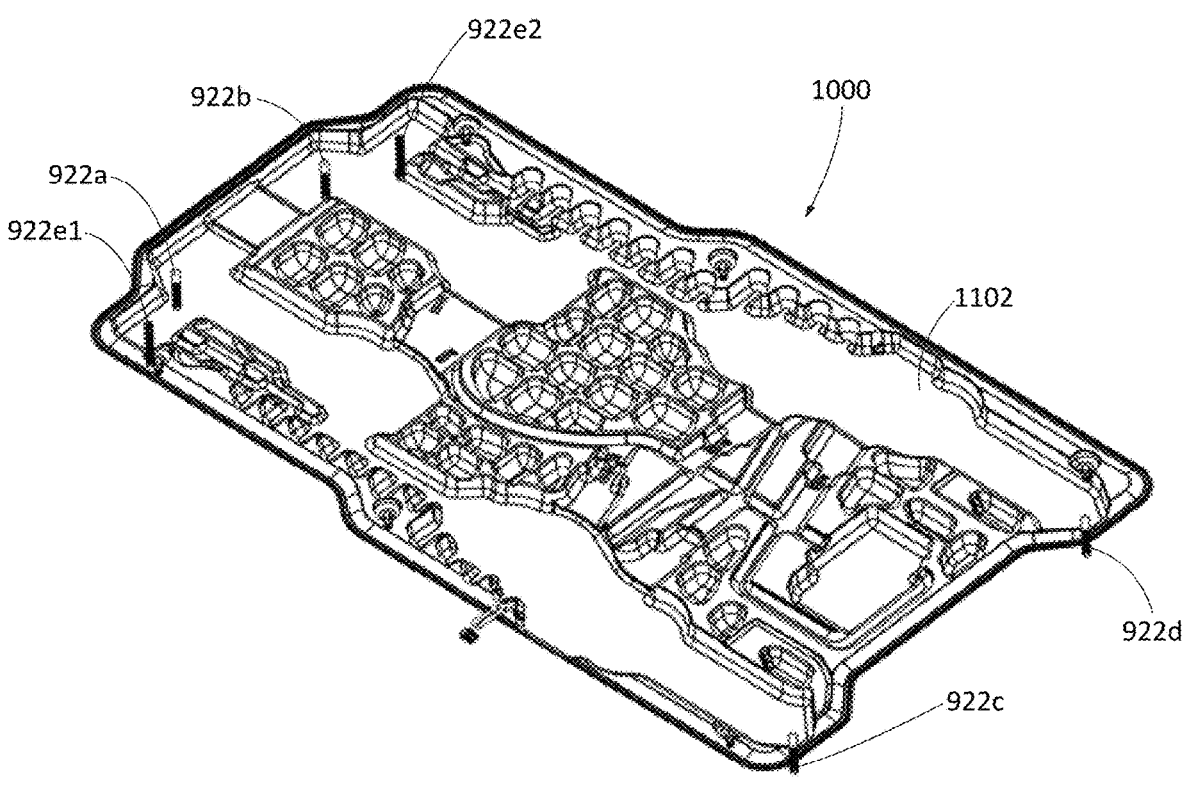
Figures 37, 38, 39:
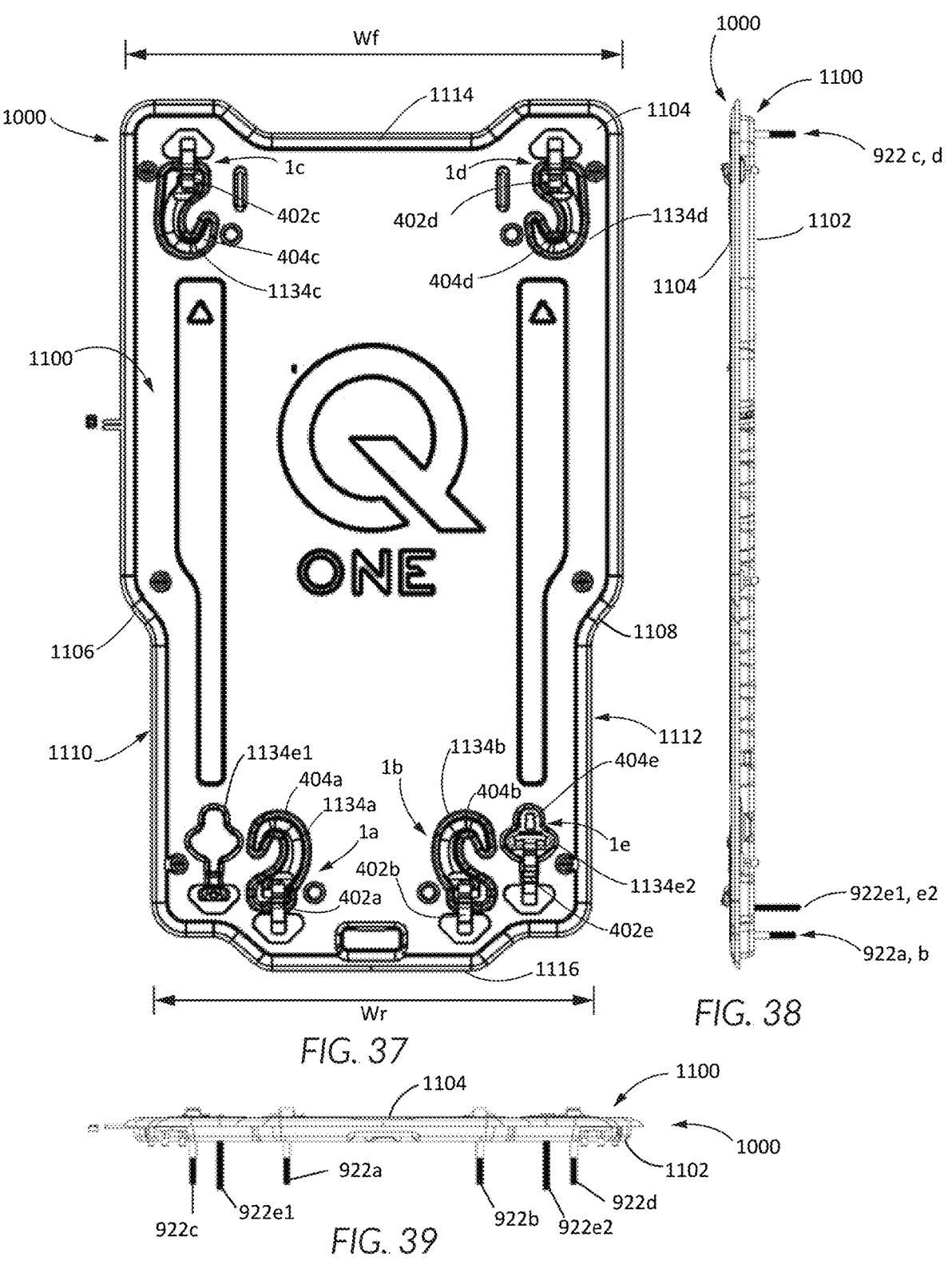
Figure 40:
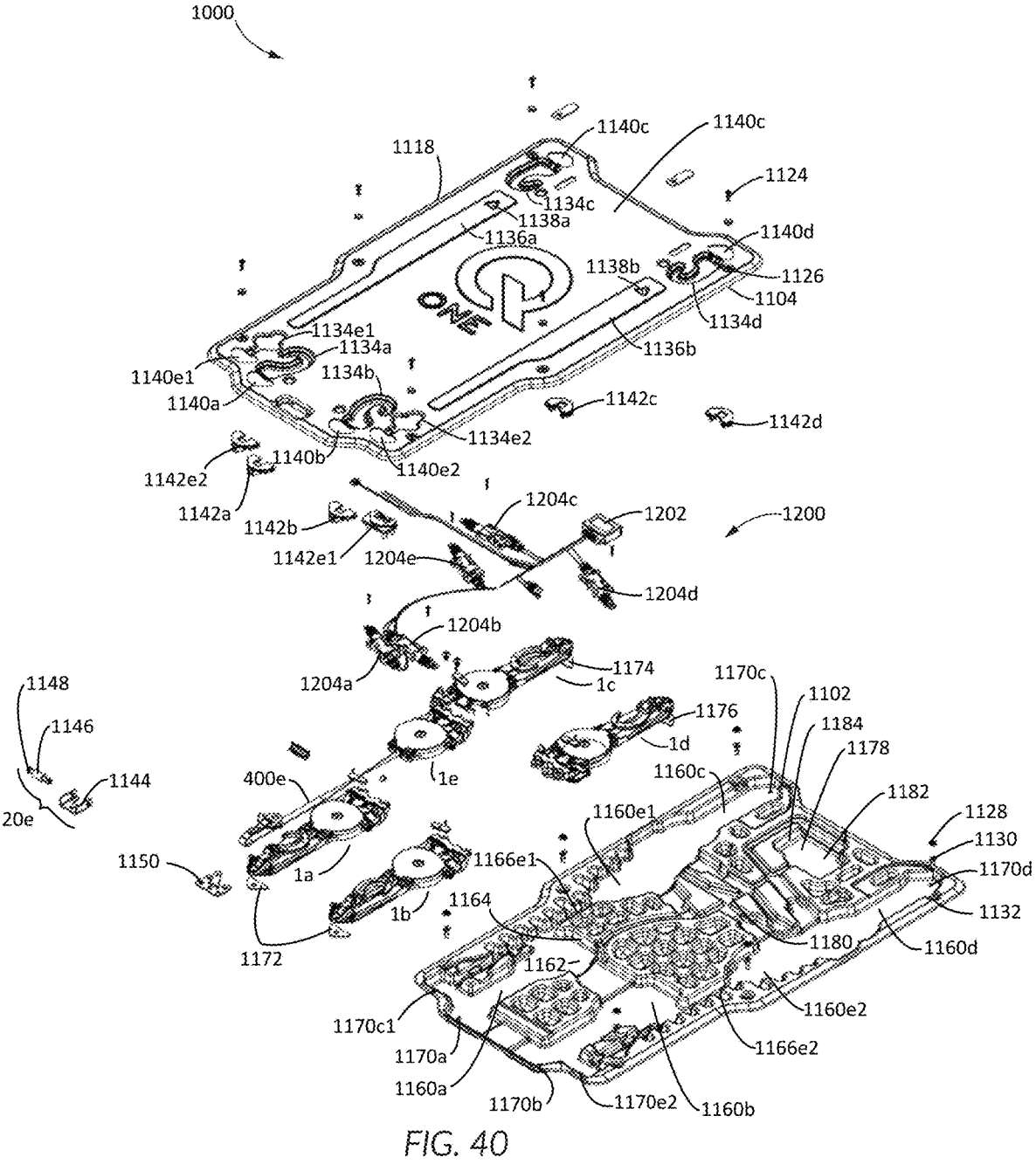
Figure 41:
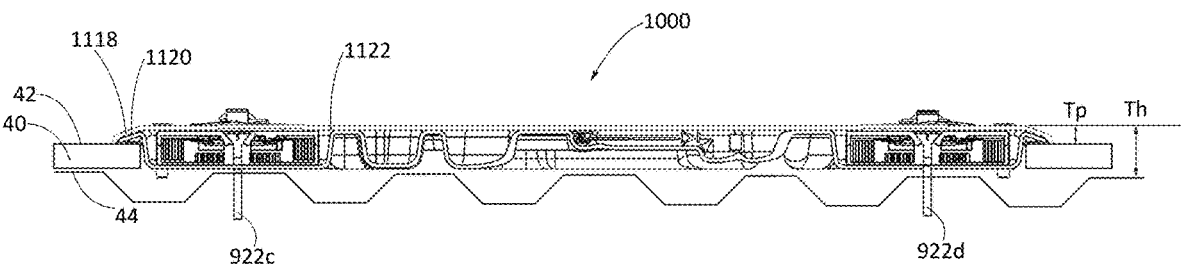
Figure 42:
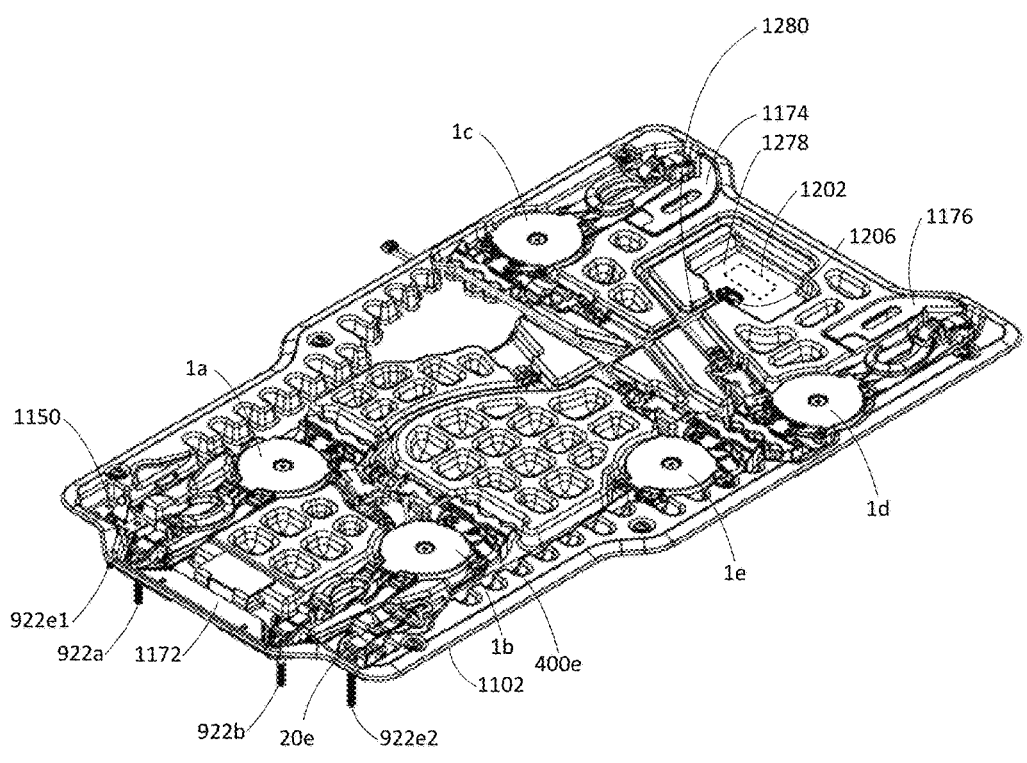
Figure 46:
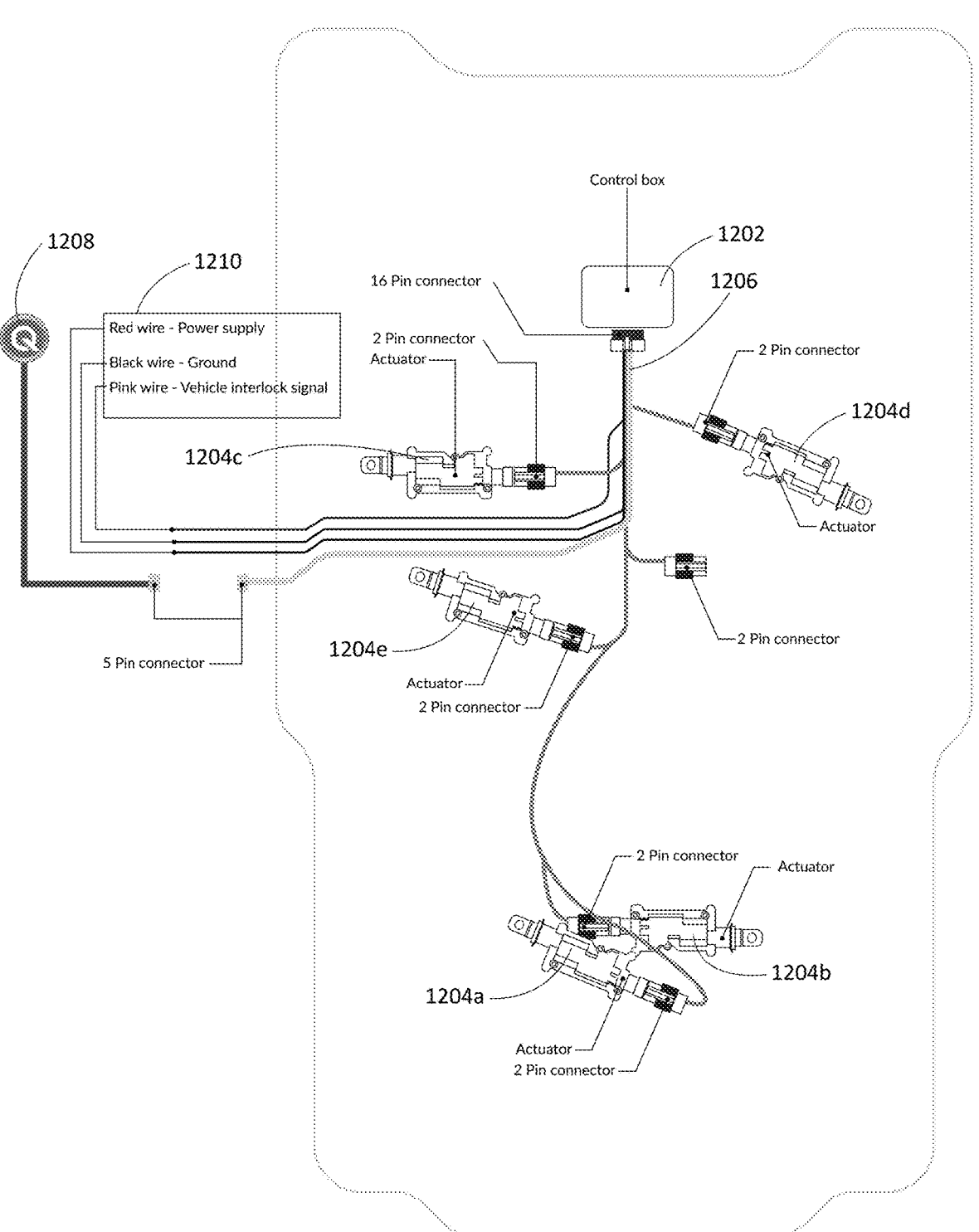
Figure 47:
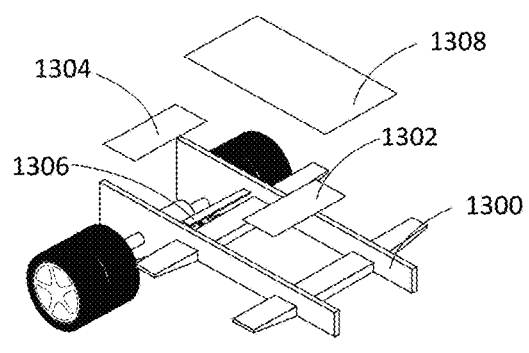
Figure 48:
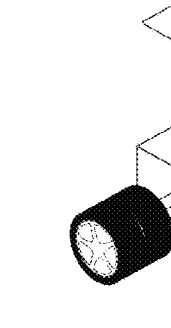
Figure 49:
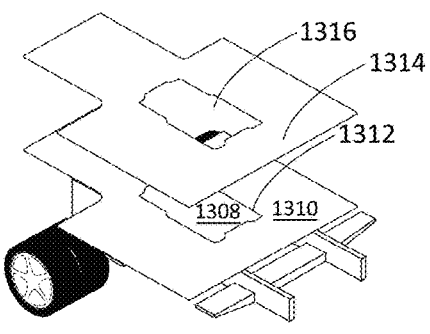
Figure 50:
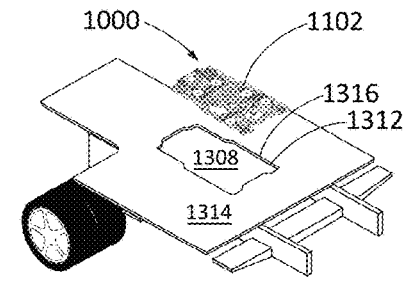
Figure 51:
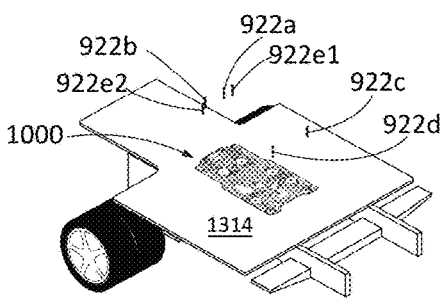
Figure 52:
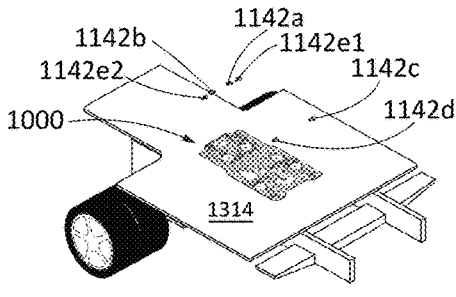
Figure 53:
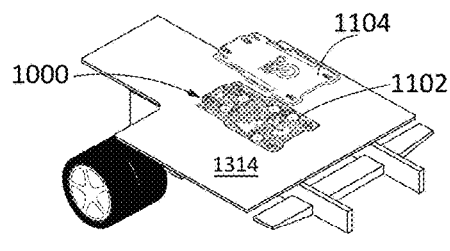
Figure 54:
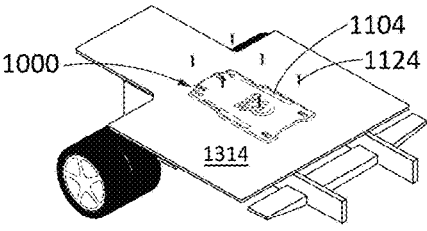
Figures 55, 56, 57, 58:
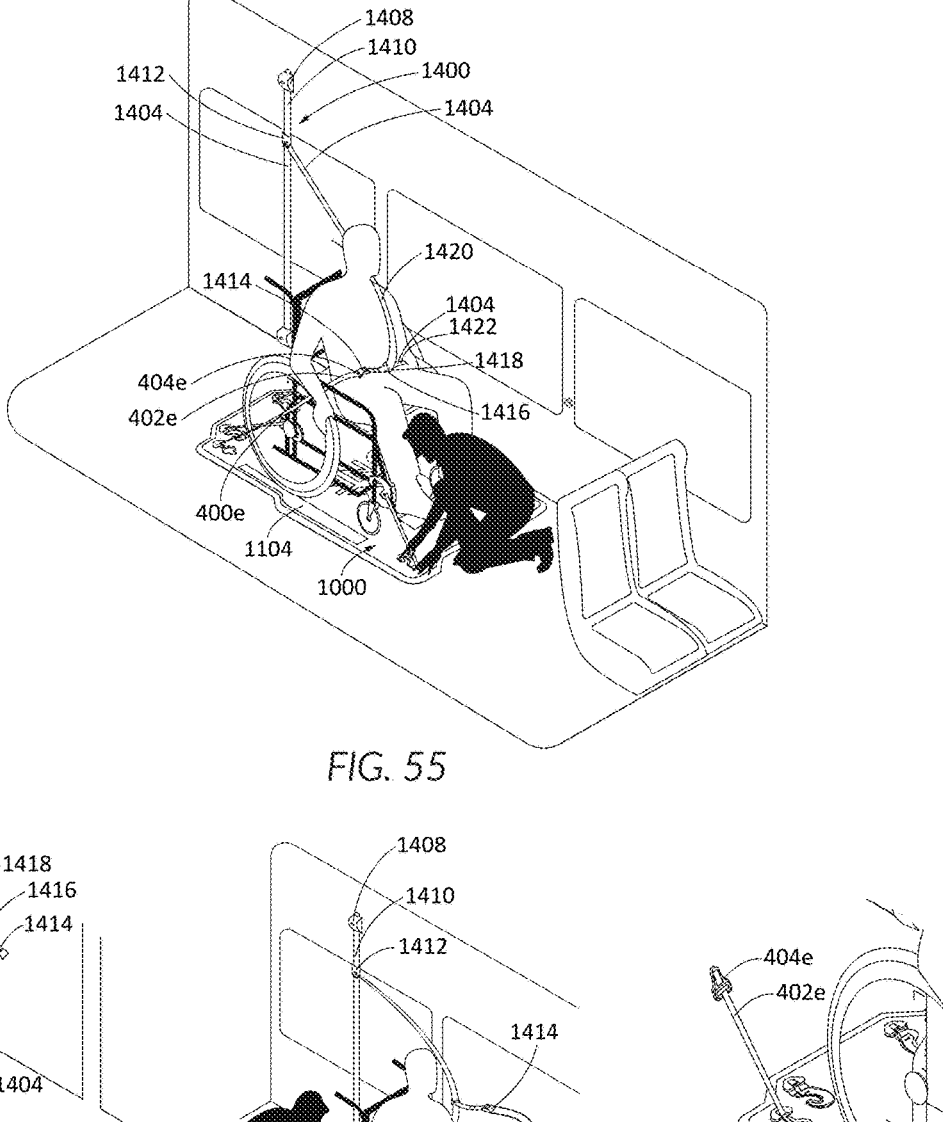

FIG. 20 is a first perspective view of the driver of the retractor module;

FIG. 21 is a first exploded view of the top cover of the retractor module, in combination with a friction disc;

FIG. 22 is a third perspective view of the top cover of the retractor module, in combination with the friction disc;

FIG. 23 is a fourth perspective view of the top cover of the retractor module, in combination with the friction disc;

FIG. 24 is a fifth perspective view of the top cover of the retractor module, in combination with the friction disc, the driver, and an axial spring;

FIG. 25 is a sixth perspective view of the top cover of the retractor module, in combination with the friction disc, the driver, and the axial spring;

FIG. 26 is a first exploded view of the top cover, the bottom cover, and a bridge of the retractor module;

FIG. 27 is a first perspective view of the top cover, the bottom cover, and the bridge of the retractor module;

FIG. 28 is a first perspective view of the bridge of the retractor module, in combination with the restraint and drum;

FIG. 29 is a first perspective view of the restraint of the retractor module, in combination with the drum and a roller;

FIG. 30 is a second side view of the retractor module;

FIG. 31 is a first cross sectional view of the bridge of the retractor module;

FIG. 32 is a second cross sectional view of the bridge of the retractor module;

FIG. 33 is a third cross sectional view of the bridge of the retractor module;

FIG. 34 is a fourth cross sectional view of the bridge of the retractor module;

FIG. 35 is a first perspective view (showing a top side) of a first embodiment of an in-floor wheelchair tiedown and occupant restraint system ("in-floor system"), which contains a plurality of retractor modules;

FIG. 36 is a second perspective view (showing a bottom side) of the in-floor system;

FIG. 37 is a top view of the in-floor system;

FIG. 38 is a right side view of the in-floor system;

FIG. 39 is a rear side view of the in-floor system;

FIG. 40 is a first exploded view of the in-floor system;

FIG. 41 is a first cross-sectional view of the in-floor system installed in a vehicle floor;

FIG. 42 is a first perspective view of a bottom panel of the in-floor system;

FIG. 43 is a first perspective view of a first embodiment of an aperture cover for a top panel of the in-floor system;

FIG. 44 is a first perspective view of a second embodiment of an aperture cover for the top panel of the in-floor system;

FIG. 45 is a close-up perspective view of a pair of actuators for the retractor modules installed in the in-floor system;

FIG. 46 is a schematic top view of a control system for the retractor modules installed in the in-floor system;

FIG. 47 is first perspective view demonstrating the first step for installing the in-floor system in a vehicle;

FIG. 48 is a second perspective view demonstrating the second step for installing the in-floor system in a vehicle;

FIG. 49 is a third perspective view demonstrating the third step for installing the in-floor system in a vehicle;

FIG. 50 is a fourth perspective view demonstrating the fourth step for installing the in-floor system in a vehicle;

FIG. 51 is a fifth perspective view demonstrating the fifth step for installing the in-floor system in a vehicle;

FIG. 52 is a sixth perspective view demonstrating the sixth step for installing the in-floor system in a vehicle;

FIG. 53 is a seventh perspective view demonstrating the seventh step for installing the in-floor system in a vehicle;

FIG. 54 is a eighth perspective view demonstrating the eighth step for installing the in-floor system in a vehicle;

FIG. 55 is a first perspective view of a vehicle showing a wheelchair and wheelchair occupant secured with the in-floor system;

FIG. 56 is a close up perspective view showing a first step of securing the occupant with the occupant restraint;

FIG. 57 is a second close-up perspective view showing a second step of securing the occupant with the occupant restraint;

FIG. 58 is a third close-up perspective view showing a third step of securing the occupant with the occupant restraint;

FIG. 59 is a first perspective view of the occupant restraint;

FIG. 60 is a second perspective view of the vehicle showing the occupant restraint in a stored configuration; and, FIG. 61 is a third perspective view of the vehicle showing the occupant restraint in a preset configuration.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from Figure to Figure in the following detailed description of the drawings.

DETAILED DESCRIPTION OF THE PRESENT EMBODIMENTS

For the purpose of promoting an understanding of the principles of the inventions, reference will now be made to the embodiments illustrated in the drawings and specific language will be used to describe the same. It will nevertheless be understood that no limitation of the scopes of the inventions is thereby intended. Any alterations and further modifications in the described embodiments and any further applications of the principles of the inventions as described herein are contemplated as would normally occur to one skilled in the art. Although a limited number of embodiments are shown and described, it will be apparent to those skilled in the art that some features that are not relevant to the claimed inventions may not be shown for the sake of clarity.

Figures 1, 2, 3:
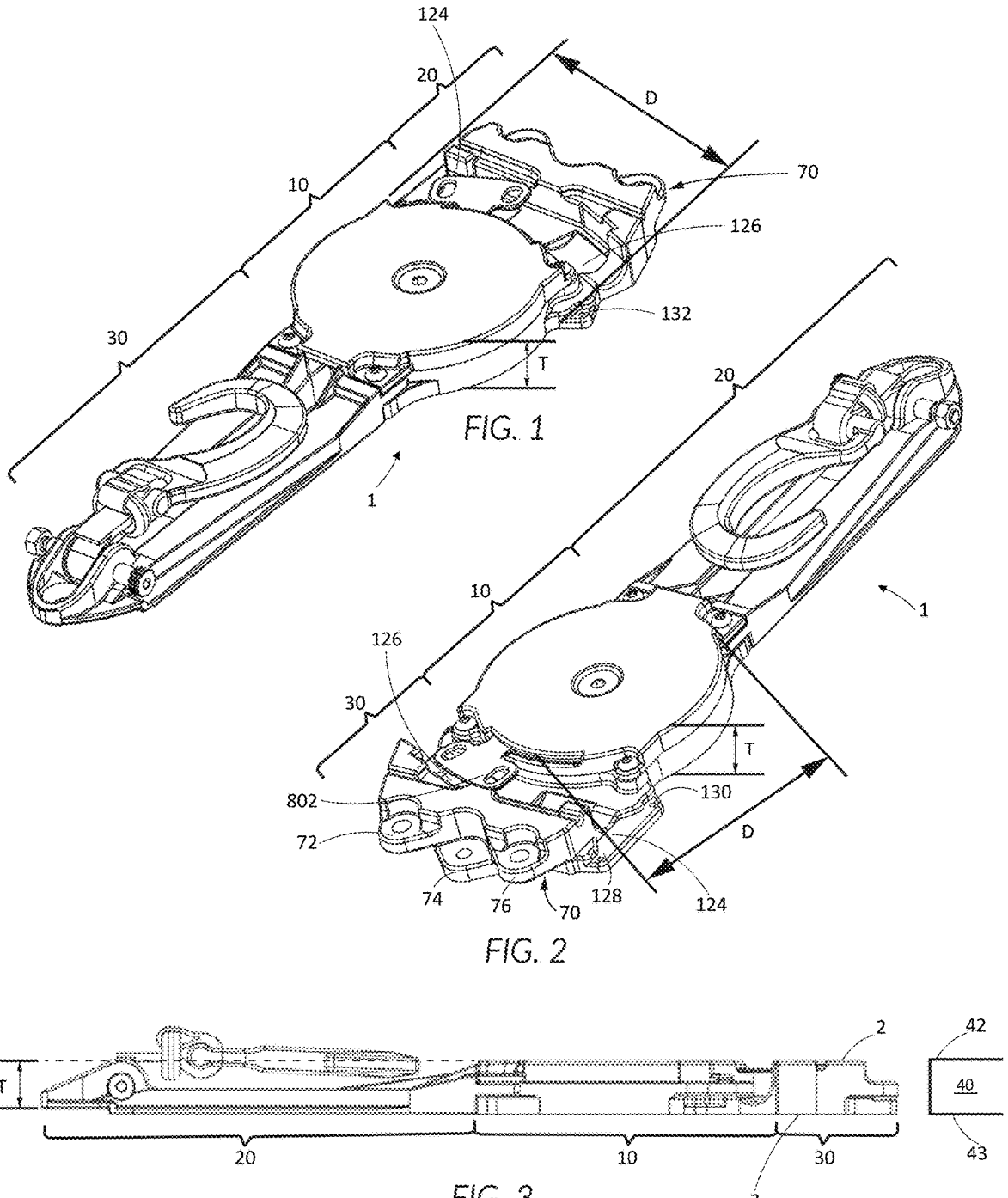
FIG. 1 is a first perspective view of a first embodiment retractor module of the present inventions.
FIG. 2 is a second perspective view the retractor module.
FIG. 3 is a first side view of the retractor module.

With reference first primarily to FIGS. 1-3, which reflect a first embodiment, an improved retractor may be assembled as a retractor module 1 suitable for incorporation into a wheelchair and wheelchair occupant (or other type cargo) securement system in a vehicle. The retractor module 1 comprises at least a retractor portion 10, and possibly one or both of a restraint guide portion 20 and a retractor actuator portion 30. The retractor module 1, or one or more portions

10, 20, 30 thereof, may be characterized as having a flat or "pancake" configuration, where the thickness T (measured along an axis parallel to the axis 5 of the retractor spool), which may generally correspond to the width $W_R$ of the restraint 400, is particularly small in comparison to prior art retractors used in the wheelchair securement industry. The thickness T of the shown embodiment is approximately 1.07 inches, although alternative embodiments may have a larger or smaller thickness T, for example less than or approximately equal to 2 inches, less than or approximately equal to 1½ inches, less than or approximately equal to 1¼ inches, less than or approximately equal to 1 inch, or less than or approximately equal to % inch.

In comparison, prior art retractors in the wheelchair securement industry (such as the Q' Straint QRT series retractors) utilize restraints (of the webbing type) which alone have a width of 2 inches or more. Moreover, those prior art retractors place the mechanical components (e.g., ratchets, pawls, springs, etc.) to one or both sides of the restraint spool, which further increases the thickness of the prior art retractors.

As will be discussed in more detail below, a significantly reduced thickness T is achieved with the retractor module 1 by reducing the width $W_R$ of the restraint 400 as compared to the prior art and/or by placing mechanical components inside the core 306 of the retractor spool. Naturally, the diameter D of the retractor portion 10 may need to increase as compared to the prior art to accommodate increased restraint thickness (which may be required to achieve the necessary strength) and an enlarged spool core 306. Nonetheless, the retractor module 1 may be more dimensionally suitable for easy integration into, in front of, or behind various structures of a vehicle, such as a vehicle floor or walls. For instance, the thin profile of the retractor module 1 permits it to lay flat adjacent such structures while taking up little space. In some applications, one or both of the upper surface 2 and/or lower surface 3 of the retractor module 1 (or other external housing for the retractor module 1, for example the housing 1100 described below) may sit flush (or approximately flush, i.e., within roughly ½ or ¼ inch, allowing wheeled mobility devices to roll over the retractor module 1) with one or both of the opposite faces 42, 43 of the structure 40 for a clean integrated look.

The flush/approximately flush arrangement (shown in FIG. 3) is particularly suitable in a vehicle utilizing aftermarket or add-on flooring (such as wood, plywood, composite wood or extruded aluminum—or similar or other material or construction—panels) that sit on top of the OEM vehicle floor. In this application, the thickness of the retractor module 1 may be less than or slightly greater than/approximately equal to (for example, within ½ or ¼ inch) the thickness of the add-on flooring, so that no large holes need to be cut in the OEM vehicle floor. Ideally, cutouts can be easily made in the add-on flooring which generally match the shape of the retractor module 1, and only a small, single hole will need to be drilled in the OEM vehicle to receive an anchor (e.g., nut and/or bolt) for the retractor module 1. In some applications, it may be desirable to also install a bracket below the vehicle floor to provide a solid anchoring location.

Figure 4:
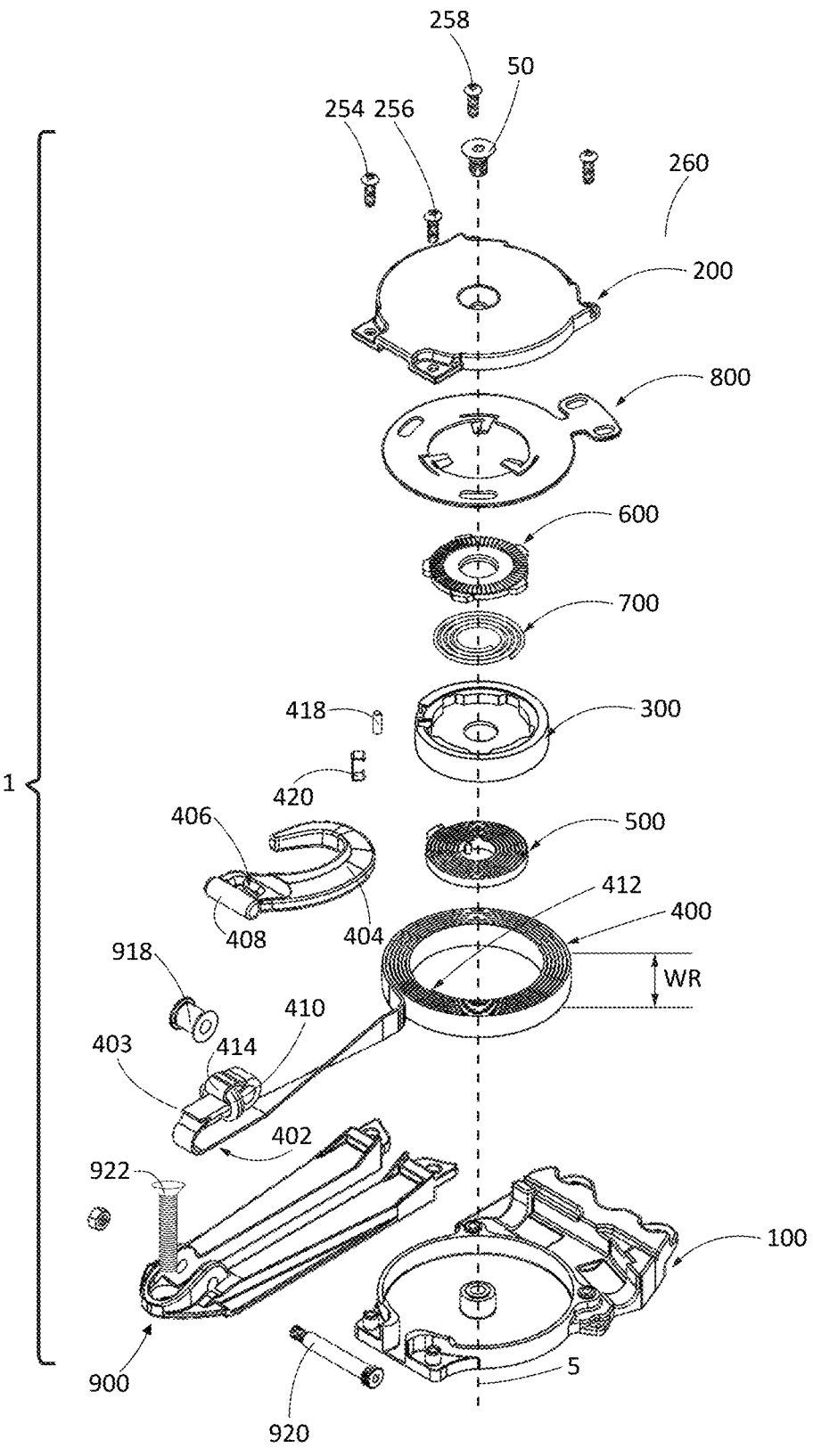
FIG. 4 is an exploded perspective view of the retractor module.

Turning now primarily to FIG. 4, the retractor module 1 is exploded to reveal its component parts, which in various embodiments may comprise any one or more of bottom cover 100, top cover 200, spool (or drum) 300, restraint 400, rotational spring 500, driver 600, axial spring 700, friction disc 800, and bridge 900.

Figure 5:
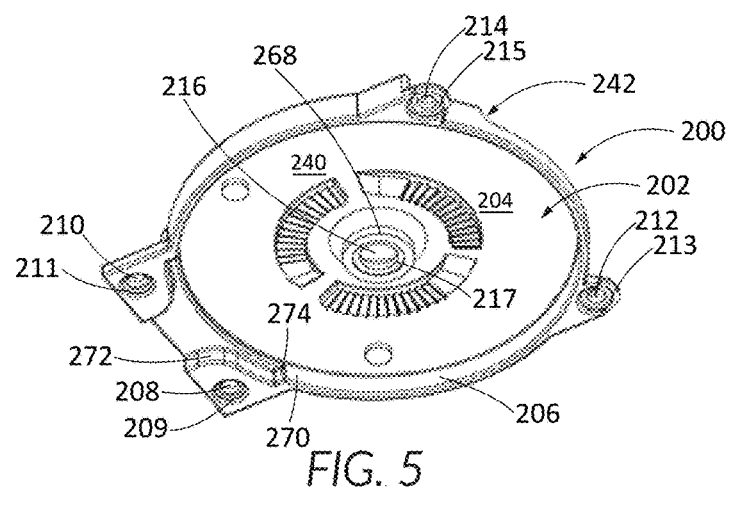
FIG. 5 is a first perspective view of a top cover of the retractor module.
Figure 6:
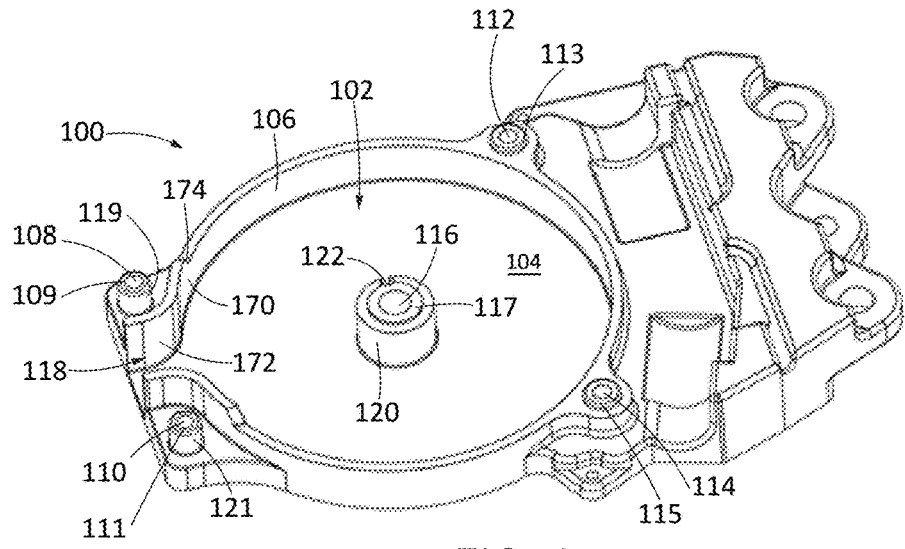
FIG. 6 is a first perspective view of a bottom cover of the retractor module.
Figure 7:
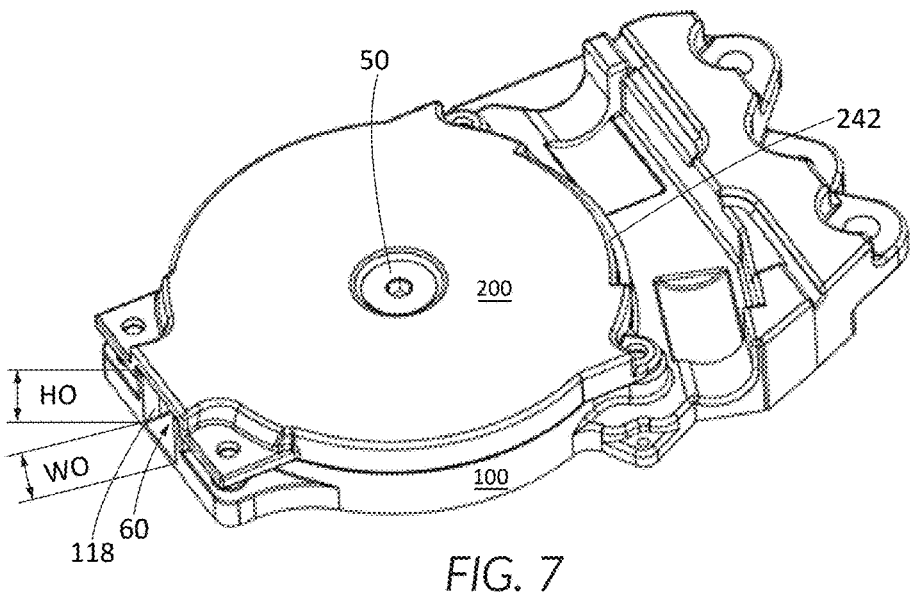
FIG. 7 is a first perspective view of an assembled top cover and bottom cover of the retractor module.

Turning now primarily to FIGS. 5-7, the top cover 200 and the bottom cover 100 are shown in further detail, which when combined define a frame with a chamber 60 for the spool 300. A first portion 102 of the chamber 60 may be defined by a bottom plate 104 and a circular sidewall 106 of the bottom cover 100, while a second portion 202 of the chamber 60 may be defined by a top plate 204 and a circular sidewall 206 of the top cover 200. As can be appreciated, the top cover 200 and bottom cover may be secured together via one or a plurality of fastening members, such as apertures or threaded holes 108, 110, 112, 114 on the bottom cover 100 which align with apertures 208, 210, 212, 214 on the top cover 200 for receiving fasteners 254, 256, 258, 260 (shown in FIG. 4). Apertures 108, 110, 112, 114 may be defined inside of nesting (or registration) members 109, 111, 113, 115 that nest with corresponding nesting (or registration) members 209, 211, 213, 215 (into which apertures 208, 210, 212, 214 are formed), where such nesting members and corresponding nesting members may take many alternative forms including the pegs/male members 109, 111, 113, 115 and recessed areas/female members 209, 211, 213, 215 and serve to not only align and center the bottom and top covers 100, 200, but also to prevent rotation of the top cover 200 relative to the bottom cover 100 (the underside of the top cover 200 includes features described in further detail below that prevent rotation of the spool 300, even in the presence of high pulling forces that will be exerted on the restraint 400 during a vehicle accident, which pulling forces will naturally translate to high rotational forces/torque on the spool 300). The top cover 200 may additionally be secured to the bottom cover 100 via a fastener (e.g., a bolt) 50 inserted through centrally located aperture 216 and centrally located aperture or threaded hole 116. The fastener 50 helps resist internal stresses that would tend to push the top cover away from the bottom cover or permit the top plate 204 and/or the bottom plate 104 to flex or bow outward, thereby releasing or allowing slippage of the internal locking mechanism that are described in more detail below. As before, aperture 116 may be defined in a nesting member 117 that nests with corresponding nest member 217 (into which aperture 216 is formed). Also as before, the nest member 117 and corresponding nest member 217 can take many alternative forms, including peg/male member 117 and recessed area/female member 217 as shown. In alternative embodiments, one of the sidewalls 106 or 206 may be eliminated, where sidewalls will be present on only one of the top cover 200 or the bottom cover 100. In other embodiments, the apertures 208, 210, 212, 214, 216 may be threaded, as opposed to apertures 108, 110, 112, 114, 116, where fasteners 254, 256, 258, 260, 50 may be inserted from the underside of the retractor module 1. In yet other embodiments, none of the apertures 108, 110, 112, 114, 116, 208, 210, 212, 214, 216 will be threaded, and instead a nut will be utilized in combination with a threaded fastener.

One or more of the sidewalls 106, 206, bottom wall 104, and top wall 204 may collectively define a mouth or opening 118 where the free end 402 of the restraint 400 may leave the chamber 102, 202 of the retractor portion 20. As shown, the sidewall 106, bottom wall 104, and top wall 205 define the mouth 118. The sidewalls 106, 206 may be configured to engage to transfer the torque and resist rotation of the first cover relative to the second cover. In this case, the sidewalls 106, 206 both include circular wall portions 170, 270 and diverging wall portions 172, 272 (one set of each on either side of the mouth 118), where the diverging wall portions 172, 272 diverge from the circular wall portions 170, 270. The diverging wall portion 272 overlaps with (in this case, sits to the outside of) diverging wall portion 172, whereby the diverging wall portions 172, 272 will engage when the top cover 200 and bottom cover 100 are torqued relative to each other to transfer the torque and resist rotation of the top cover 200 relative to the bottom cover 100. More particularly, engagement between the inside surfaces of diverging wall portion 272 and outside surfaces of diverging wall portion 172 serves to further resist rotational forces/torque exerted on the top cover 200 relative to the bottom cover 100. Further yet, in this case, the circular wall portions 170, 270 may each define engaging faces 174, 274 (one set of each on either side of the mouth 118) that are configured at an angle to a reference plane that is normal to axis 5 (i.e., at an angle to/not parallel with the bottom plate 104). At least one set of the engaging faces 174, 274 are configured to engage when the top cover 200 and bottom cover 100 are torqued relative to each other to transfer the torque and resist rotation of the top cover 200 relative to the bottom cover 100.

As shown, the mouth or opening 118 may have both a height Ho and a width Wo that are greater than the width $W_R$ of the restraint 400, which permits the restraint 400 to have any orientation (vertically, horizontally, or at an angle) as it extends through the opening 118. The sidewalls 106, 206 which define the opening 118 may have a contour or curvature as shown to guide the restraint 400 off of the spool 300 and through the opening 118.

With reference now primarily to FIGS. 8-10, the spool 300 may comprise a ring or annular portion 302 defining a peripheral outer surface 304 for spooling the restraint 400 and a core 306, which defines at least one open volume for receiving mechanical components. The spool 300 may, as shown, include a flange 308 extending inward from the inner surface 310 of the ring 302. The flange 308 is substantially thinner that the thickness $T_S$ of the spool ring 302, whereby the flange 308 divides the core 306 into two open volumes: an upper core 312 and a lower core 314, which may, as shown, be interconnected via one or more holes (e.g., the central hub 316 described below). The flange 308 further includes a central hub 316 for receiving a spindle 120 that projects upward from the bottom plate 104 of the bottom cover 100 and/or spindle 268 that project downward from the top plate 204 of the top cover 200. In this case, the spindle 120 is fixed and contains the centrally located threaded hole 116 described above. For the avoidance of doubt, in alternative embodiments, the spindle 120 can be integrated with and project downward from the top cover 200, rather than projecting upward from the bottom cover 100, and could rotate relative to the covers 100, 200.

Tolerances in the respective diameters of the central hub 316 and spindles 120, 268 permit the spool 300 to rotate about the axis of the spindles 120, 268 relative to the bottom and top covers 100, 200, although the spindles 120, 268 could include bearings or reduced friction materials to facilitate smoother rotation of the spool 300.

Rotational spring 500 is disposed between bottom cover 100 and the spool 300, in particular at least partially, substantially, or wholly inside the lower core 314 of the spool, to bias/torque the spool 300 in a clockwise direction CW (when viewed from above). In that regard, the spring 500 creates a retraction force on the restraint 400 that tends to pull the free end 402 of the restraint 400 back into the chamber 40 of the retractor portion 10. In this embodiment, the rotational spring 500 is a coiled metal tape having resilient properties, although other spring devices could be used to provide a retraction force, including but not limited to gas springs.

The rotational spring 500 may include a first engagement member 502 that engages with a corresponding engagement member 312 on the spool 300. In this case, the first engagement member 502 comprises a hook shape that fits within the corresponding engagement member 312, a hook-shaped notch formed in the ring 302. The rotational spring may also include a second engagement member 504 that engages with a corresponding engagement member 122 on the bottom cover 100. In this case, the second engagement member 504 is formed by coiling the metal tape of the rotational spring 500 in a small-diameter circle that fits within the corresponding engagement member 122, an open-sided circular aperture formed in the spindle 120.

Turning now primarily to FIGS. 11-13, the restraint 400 may take the form of any material of sufficient strength for the anticipated loads in the application of concern, which may be securing a wheelchair and/or wheelchair occupant during transit in a vehicle. As shown, the restraint 400 takes the form of a webbing-type material. As shown, the restraint is rectangular or tape-shaped, with a width $W_R$ of approximately 19 mm or ¾ inches, a thickness $T_R$ of approximately 3 mm or 0.12 inches, and a length $L_R$ of approximately 187 cm or 75.5 inches, although those dimensions may be changed specific for the application of concern.

At its free end 402, the restraint 400 may include a connection member (or connector) for connecting to the object of concern (e.g., a wheelchair or a lap belt for a wheelchair occupant). As shown, the connection member takes the form of a hook 404, where the hook 404 has an eye 406 at its base for receiving the restraint 400. The eye 406 may include a bearing surface for minimizing friction and distributing forces on the restraint. As shown, the bearing surface comprises a round bar 408. To enable easy assembly and ensure a sufficiently strong connection between the restraint 400 and the hook 404, the distal end 403 of the restraint is inserted through a ring 410, doubled over itself for approximately 14 cm or 5.5 inches, and sewn together. Glue, welds, or other adhesive materials or techniques may be applied between the touching faces of or at the doubled-over portion of restraint 400 to strengthen the connection. The proximal end 412 of the restraint can then be inserted first through the eye 406 of the hook 404, be inserted second through the opening of the ring 410, and then pulled tight to secure the restraint 400 to the hook 404 (as shown in FIG. 13). This connection configuration has been shown to be significantly stronger and more compact than simply inserting the restraint 400 through the eye 406 of the hook 404, and then doubling and sewing the restraint together (in a manner similar to how the ring 410 is secured to the restraint 400).

To facilitate securing the proximal end 412 of the restraint 400 to the spool 300, a hoop 414 is formed at the proximal end 412 by doubling the terminal end 416 of the restraint 400 over itself with a length of approximately 27.9 mm or 11 inches (although that length may be changed specific for the application of concern), and then sewing the doubled-over segment together while leaving the hoop 414 open at the proximal end 412. As before, glue, welds, or other adhesive material or technique may be applied between the touching faces of or at the doubled-over portion of restraint 400 to strengthen the connection.

Turning now primarily to FIGS. 14-16, the restraint 400 is shown secured to the spool 300. Any method may be used to secure the restraint 400 to the spool. As shown, however, a dowel pin 418, spring clip 420, and glue 422 are used. More specifically, the dowel pin 418 is inserted into the hoop 414 at the proximal end 412 of the restraint, whereafter the hoop 414 and dowel pin 418 are placed within a pocket 318 formed in the peripheral outer surface 304 of the spool 300. The restraint 400 may then be wound around the spool in a counterclockwise direction CCW. The spring clip 420, which as shown is generally C-shaped and engages with inwardly facing shoulders 320 of the ring 302, is used to secure the first pass of the restraint 400 to the spool 300. For a more firm connection, glue 422 or other adhesive material or technique may be applied to the surface of the restraint 400 facing the peripheral outer surface 304 of the spool. For a stronger connection, the glue 422 may be applied for at least one rotation around the spool 300, and more preferably at least 1.5 rotations (between 1-1.5 rotations, the second pass of the restraint is glued to the already spooled first pass).

Notably, the ring 302 of the spool 300, and more particularly the peripheral outer surface 304 of the ring, may be snail-shaped when viewed from above, rather than perfectly circular. Considering the stacking nature of the restraint 400, and the doubled-over proximal end 412 of the restraint 400, the snail shape allows the outside surface of the spooled restraint 400 to be more closely circular in shape (without bumps like prior art retractors, which bumps are usually present at the radial where the restraint attaches to the spool), which allows a smoother operation when the restraint 400 is pulled out by the user, or retracted by the coiled spring 500. More particularly, the radius of the ring 302 is the smallest adjacent to the connection point (pocket 318) with the restraint 400, and the radius increases around the perimeter of the ring 302 in the counterclockwise direction CCW to its largest adjacent to (on the opposite side of) the pocket 318

Figure 17:
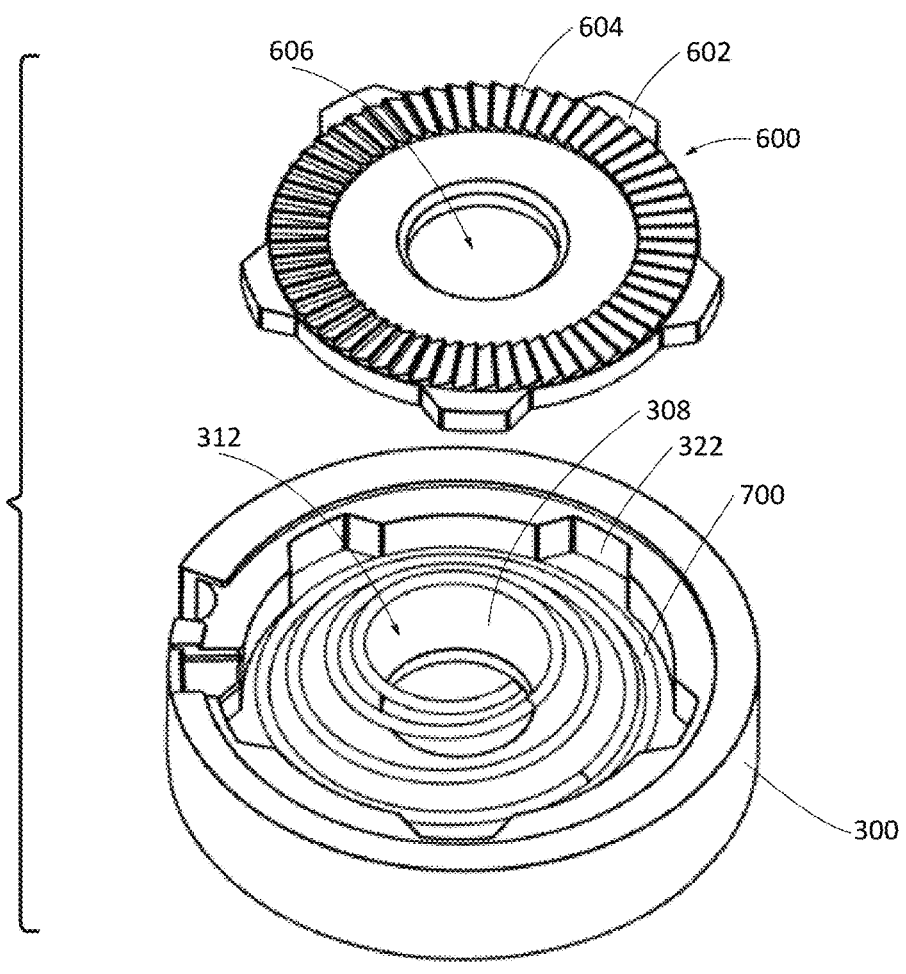
FIG. 17 is a first exploded view of the drum of the retractor module, in combination with a driver.
Figure 18:
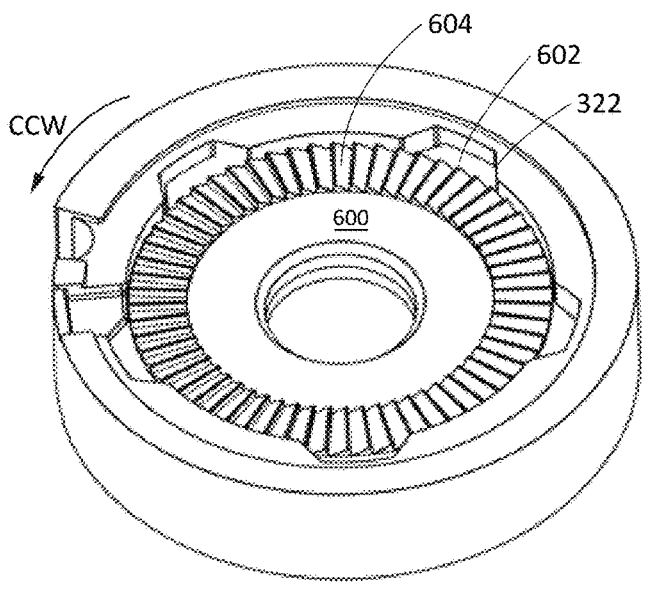
FIG. 18 is a fourth perspective view of the drum of the retractor module, in combination with the driver.

Turning now primarily to FIGS. 17-18, the driver (or ratchet) 600 and axial spring 700 at least partially, substantially, or wholly sit within the upper core 312 of the spool, wherein the upper core 312 is correspondingly shaped to the driver 600 and defines a vertical channel for translation of the driver 600 up and down. More particularly, the driver 600 is configured to move vertically (up and down) relative to the spool 300, but is radially engaged with the spool 300 so that the spool 300 and driver 600 are rotationally locked together—i.e., if one spins, the other must also spin. Any method or structure may be used to rotationally lock the driver 600 and spool 300 together. However, as shown, the driver 600 includes a series of radially extending engagement members or spurs 602 that sit within and engage with a series of corresponding pockets 322 defined by the core 312. Notably, the axial spring 700 sits between the driver 600 and the spool 300 (underneath the driver 600, and above the flange 308) and serves to bias the driver 600 in an upward direction. More specifically, the axial spring 700 engages between an underside of the driver 600 and an upper surface of the flange 308, and urges the two away from each other. The axial spring 700 may take any form, including the coiled metal wire as shown or gas springs.

Figure 19:
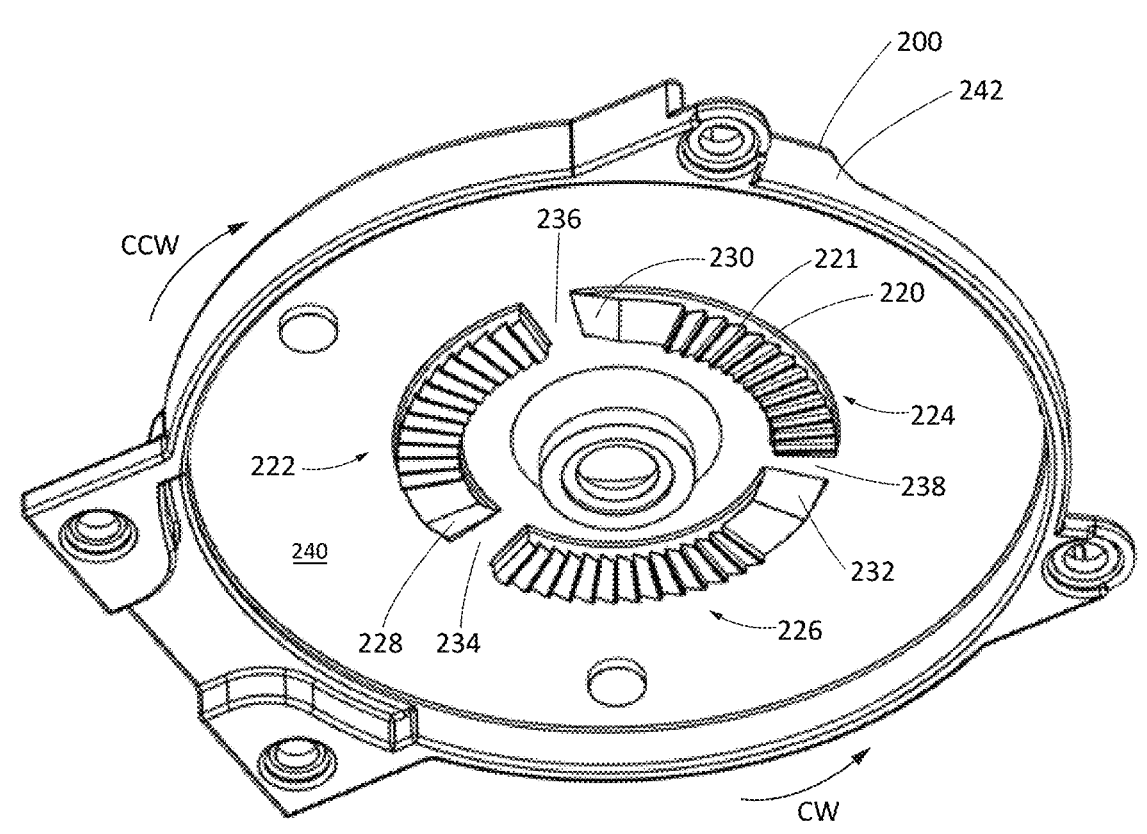
FIG. 19 is a second perspective view of the top cover of the retractor module.

With reference now primarily to FIGS. 19-20, driver 600 may be, as shown, disc-shaped (or circular with a thin profile) and include a central hub 606 for rotational engagement with at least one of spindles 120, 268. The top surface of the driver 600 may include a series of (ratchet) teeth 604 designed to engage with a corresponding series of (pawl) teeth 220 located, as one example, on the underside 240 of the upper cover 200. As shown, the teeth 604 may extend upward from a top surface of the driver 600 in a direction generally parallel with the axis 5. Similarly, the teeth 220 may extend downward from the underside 240 of the cover 200, also in a direction generally parallel with the axis 5.

Teeth 604, 220 may be distributed around the axis 5, for engagement with each other at multiple points distributed around axis 5. As configured, when the driver 600 is in its upwardly biased position, the generally or substantially vertical faces of teeth 604, 220 engage to prevent rotation of the driver 600, and thereby the spool 300, in a counterclockwise direction CCW. However, considering the correspondingly ramped faces of the teeth 604, 220, a rotational force on the spool 300 in a clockwise direction CW translates to the creation of a downward force on the driver by virtue of the ramped faces of the teeth 604, 200 sliding relative to each other, whereby the driver 600 will recess within the upper core 312 and compress the axial spring 700. Once the driver 600 is sufficiently recessed, tips of teeth 604 on the driver 600 will ride over tips of teeth 220 on the upper cover 200. In that respect, when the driver 600 is biased in its upper/normal position, restraint 400 may freely be retracted onto the spool 300 via the clockwise CW force exerted by rotational spring 500, but may not be withdrawn from the spool 300 by a pulling force exerted on the hook 404. However, when the driver 600 is depressed or held in a lowered position within the upper core 312 (via structures and methods described below), teeth 604 will be disengaged from the corresponding teeth 220 on the upper cover, whereby the spool 300 can freely rotate in both a counterclockwise direction CCW and a clockwise direction CW (i.e, the restraint 400 can be both pulled off of the spool 300 and retracted onto the spool 300). Obviously, the configuration of the teeth 604, 220 could be switched whereby engagement between the two would prevent rotation of the driver 600 and the spool 300 in a clockwise direction CW, but would permit rotation of the driver 600 and the spool 300 in a counterclockwise direction CCW.

The number, pitch, shape, angles, and pattern of teeth 604, 220 may be selected based on the type of application and required strength. As shown, sixty teeth 604 are arranged in a continuous circular pattern on the upper surface of the driver 600, while thirty-nine teeth 220 are arranged in a discontinuous circular pattern (three separate groups 222, 224, 226 of thirteen teeth 220) on the underside 240 of the upper cover 200. With this configuration, the number of teeth 604 define the resolution of the retractor (i.e., the length of restraint 400 that can be withdrawn or retracted as an individual tooth 604 jumps from one tooth 220 to the next), while the number of teeth 220 defines the strength of the engagement between driver 600 and the upper cover 200.

Notably, at least one group 222, 224, 226 of teeth 220 may include and begin with a ramp 228, 230, 232 extending downward from the underside 240 of the top cover, and may reach a flat 276, 278, 280 at an elevation approximately equal with or greater than the elevation of the base 221 of each tooth 220 (where the ramp elevation slopes downward in a counterclockwise CCW direction, when viewed from above). Further, the ramps 228, 230, 232 may each be separated from the previous group 222, 224, 226 of teeth (in a clockwise direction CW) by a space or land 234, 236, 238. The purpose of the ramps 228, 230, 232, flats 276, 278, 280, and lands 234, 236, 238 will become apparent with reference to the discussion below.

In that regard, turning now primarily to FIGS. 21-25, a clutch or friction disc 800 comprises a thin, disc-like structure, which may be formed from a plastic or metal or may be cut, stamped, or otherwise machined from another material plate, and may have resilient/spring-like properties. The friction disc 800 may be configured to lay flat adjacent to the underside 240 of the top cover 200, where a tab or trigger 802 may radially extend through a slot 242 in one or both of the top 204 and sidewall 206. As will be described in further detail, the trigger 802 can be rotated or moved along a circular path to rotate the friction disc 800 relative to the top cover 200 between an unlocked position and a locked position. A spring interconnected between the trigger 802 and the retractor frame (e.g., covers 100, 200) (or other structure fixed relative to the retractor 1) may bias the trigger 802 in the locked position, whereby the trigger 802 can be manipulated by hand to an unlocked position. In other embodiments (with or without a biasing spring), the trigger 802 can be manipulated between the locked and unlocked positions using various mechanisms, such as cables, solenoids, hydraulic or pneumatic cylinders, linear actuators, etc. In the unlocked position, the friction disc 800 pushes the teeth 604 (and therefore the driver 600) downward and out of engagement with the teeth 220 on the underside 240 of the top cover 200. In the locked position, the friction disc 800 allows the axial spring 700 to push the driver 600 upward, whereby teeth 604 engage with teeth 220. With particular reference to FIGS. 1 and 2, the retractor actuator portion 20 of the retractor module 1 may include at least one and, as shown, two cradles 124,126 in the bottom cover 100 for holding an actuator or other mechanism, as described for one embodiment in more detail below. The two cradles 124, 126 may be disposed on opposite sides of the trigger 802, for moving the trigger 802 between the locked and unlocked positions, and may be provided in combination with a plurality of threaded holes 128, 130, 132 for fixing the actuator or other movement mechanism to the retractor module 1.

The underside 240 of the top cover 200 and the friction disc 800 include at least one feature to limit the rotation of the friction disc 800 relative to the top cover 200 to between those two positions. Those limiting features may take any form, but in the shown embodiment the friction disc include a set of circularly oriented oval slots 804, 806 that receive circular projections 244, 246 that project downward from the underside 240 of the top cover 200, where the circular projections 244, 246 act as stops to prevent further rotation at opposite ends of the oval slots 804, 806. Additionally, each group 222, 224, 226 of teeth 220 may include a substantially vertical stop surface 262, 264, 266 that engage with a substantially vertical corresponding edge surface 838, 840, 842 when the friction disc 800 is at its fully locked position. Notably, the friction disc 800 also has an axial or ring portion 808 that defines a hub 810. That hub 810 rides on a spindle 282 defined by the outside edges 248, 250, 252 of the three groups 222, 224, 226 of teeth 220 on the underside 240 of the top cover 200.

The friction disc 800 further includes features which engage with the ramps 228, 230, 232 and lands 234, 236, 238 to engage and disengage the teeth 604 on the driver 600 with the teeth 220 on the underside 240 of the top cover 200. For example, as shown, the friction disc 800 includes corresponding ramp structures 812, 814, 816 that correspond to ramps 228, 230, 232 located on the underside 240 of the top cover (each of which can also be characterized as cam surfaces or corresponding cam surfaces). Notably, when the friction disc 800 is in the locked position (rotated fully in the clockwise direction CW— see, e.g., FIGS. 22 and 24), the upper faces 818, 820, 822 of the corresponding ramp structures 812, 814, 816 sit within the lands 234, 236, 238. And because the thickness of the friction disc 800 is approximately equal to or less than the distance between the underside 240 of the top cover and the base 221 of the teeth 220, the friction disc 800 will not prevent engagement between teeth 604 and teeth 200. However, if the friction disc 800 is rotated in a counterclockwise direction CCW relative to the top cover 200 to the unlocked position, engagement between the ramp structures 812, 814, 816 and the ramps 228, 230, 232 will push at least a portion of the friction disc 800 downward. In that respect, at least a portion of the underside 824 of the friction disc 800 will push the driver 600 downward such that teeth 604 on the driver 600 disengage from the teeth 220 on the top cover 200 (see, e.g., FIGS. 23 and 25). As shown, the underside 824 of the friction disc 800 touches and pushes the teeth 604 downward when the friction disc 800 is rotated to the unlocked position, however the friction disc 800 could be configured to touch any other portion of the driver 600.

As shown, it is contemplated that the friction disc 800 may have resilient or spring-like properties. In that regard, the ramp structures 812, 814, 816 may be present on structure (e.g., clutch members) that extend radially inward from and are connected to the hub 810 of the friction disc 800 via spring hinges 826, 828, 830 that allow the ramp structures 812, 814, 816 to flex downward out of plane with the ring portion 808 of the friction disc 800. In that respect, the undersides 832, 834, 836 of the ramp structures 812, 814, 816 are the surfaces that engage with and push the driver 600 out of engagement with the teeth 220 on the underside 240 of the top cover 200, as is better seen in FIGS. 22-25.

With reference to discussion above regarding spindle 120 on the bottom cover 100 and spindle 268 on the top cover 200, it can be seen in FIGS. 5 and 6 that the spindle 120 and spindle 268 may be coaxial and define a continuous spindle extending nearly the entire distance from the bottom plate 104 to the top plate 204, when the top cover 200 and bottom cover 100 are secured together. Moreover, with further reference to FIGS. 9-10, it can be seen that spindle 268 will lock engagement member 504 of rotational spring 500 in the corresponding engagement member 122 which is present on spindle 120. For the avoidance of doubt, it is contemplated that alternative embodiments may utilize a unitary spindle extending from top to bottom, which unitary spindle may extend from either the top cover 200 or the bottom cover 100.

While the rotational spring 500 is shown and described as disposed in the lower core 314 of the spool and engaged between the spool 300 and the lower cover 100, it is contemplated that the rotational spring 500 in alternative embodiments may be disposed in the upper core 312 and engaged between the spool 300 and the upper cover 200. Similarly, while the axial spring 700 and driver 600 are shown and described as disposed in the upper core 312, the groups 222, 224, 226 of teeth 220 are shown and described as disposed on the underside of the top cover 200, and the friction disc 800 is shown and described as disposed between the spool 300 and top cover 200, it is contemplated in alternative embodiments that the axial spring 700 and driver 600 may be disposed in the lower core 314, the groups 222, 224, 226 of teeth 220 may be disposed on the bottom cover 100, and the friction disc 800 may be disposed between the spool 300 and the bottom cover 100.

Turning now primarily to FIGS. 26-29, the retractor module 1 may be provided with a connecting member or bridge 900. The purpose of the bridge 900 may include one or more of directing the restraint 400 to a restraint guide 902, providing an anchor point 904 for the retractor module 1, and managing energy when the restraint 400 is subject to a load. As will be described below, when serving as the anchor point 904, the bridge 900 may be configured to absorb and manage large forces as they act on various components of the retractor module 1.

The bridge 900 may include a flange portion 906 at a first, or free end which is configured for receipt and securement with one or both of the top cover 200 and bottom cover 100. As shown, the flange portion 906 includes apertures 908, 910 which receive and mate with posts 119, 121 on the bottom cover 100 (which posts 119, 121 hold above-described features 109, 111 for nesting with features 209, 211 on the top cover 200). Posts 119, 121 include centrally-located threaded apertures 108, 110 which align with apertures 208, 210 on the top cover 200 and receive fasteners 254, 256, whereby the bridge 900, top cover 200, and bottom cover 100 can be fastened together.

The bridge 900 may define a pathway or channel 912, through or across which the restraint 400 extends from the mouth 118 of the retractor portion 10 to the restraint guide 902. As shown, the channel 912 may be centrally positioned between two arms 914, 916 that merge at a second end where the restraint guide 902 and/or the anchor point 904 for the retractor module 1 may be disposed.

The restraint guide 902 may take any form for guiding the free end 402 of the restraint 400 in a desired orientation and/or direction. In this case, the restraint guide comprises a roller 918 which rotates about pin/bolt 920. Pin 920 in this case is aligned parallel to a transverse axis 7 of the retractor module 1, where the transverse axis 7 lies in a horizontal plane and is transverse to both vertical axis 5 of the spool 300 and longitudinal axis 9 of the retractor module 1. Note that it may be desirable to give pin 920 an axis that is at an angle relative to transverse axis 7, e.g., tilted at an angle either or both within a horizontal plane and a vertical plane, for example by rotating the pin 920 about an axis parallel with spool axis 5 and/or rotating the pin 920 about an axis parallel with longitudinal axis 9.

When the alignment of pin 920 is transverse to spool 300 as shown, roller 918 therefore serves to change the orientation of the restraint 400 as it leaves spool 300. More particularly, the width $W_R$ of the restraint 40 (referred to herein as a restraint lateral axis) is aligned vertically (or parallel to spool axis 5) when it is spooled on spool 300 and is aligned horizontally (or parallel to transverse axis 7) as it passes by the roller 918. In that respect, the restraint 400 may include a twisted region 424 between the spool 300 and roller 918 wherein the restraint 400 twists approximately 90°. In other embodiments, where the pin 920 is at an angle relative to the transverse axis 7 as described above, the twist angle may be any angle greater than 0° and up to 90°, including but not limited to approximately 15° or greater, approximately 30° or greater, approximately 45° or greater, approximately 60° or greater, approximately 75° or greater, approximately 80° or greater, approximately 85° or greater, any angle between therebetween.

The roller 918 further serves to redirect the free end 402 of the restraint. In a typical installation where four restraint modules 1 are floor installed and used to secure a wheelchair at all four corners, the restraint 400 for each restraint module 1 will be oriented roughly horizontally as it extends from the spool 300 to the roller 918 thereby defining a first restraint longitudinal axis 1LA), and the free end 402 of the restraint 400 will be oriented at an angle of roughly 30-60° relative to horizontal as it extends from the roller 918 to the wheelchair attachment point, more preferably approximately 30-45° for rear wheelchair tiedowns and approximately 40-60° for front wheelchair tiedowns (thereby defining a second restraint longitudinal axis 2LA). Ideally, to save space in the vehicle, it would be desired to orient the restraint modules 1 where the spools 300 are more centrally located relative to the wheelchair and the restraint guides 902 are oriented toward either the front end or rear end of the wheelchair. In that respect, the roller 918 serves to redirects the webbing by a redirect angle RA (defined between the first restraint longitudinal axis 1LA and the second restraint longitudinal axis 2LA) that will exceed 90°, more particularly approximately 120-150° to achieve the 30-60° orientation described above, approximately 135-150° to achieve the 30-45° orientation described above for rear wheelchair tiedowns, and approximately 120-135° to achieve the 40-60° orientation described above for front wheelchair tiedowns.

The restraint module may be configured to be anchored to a surface using a single bolt 922 inserted though an aperture at the anchor point 904 at the end of the bridge 900 distal to the retractor portion 10. In that respect, the retractor portion is configured to "float" at the end of the bridge 900, where the bridge 900 may be characterized as a column in the structural sense. More particularly, when the retractor portion 10 is locked (i.e., restraint 400 cannot be withdrawn from the spool 300) and the restraint 400 is under tension (e.g., during a vehicle accident), the bridge 900 experiences a compressive column load of roughly equal value. The bridge 900 behaves as a fixed/free column because only one end is rigidly bolted to a surface (e.g., a vehicle frame or floor or other structure). The other end is only supported by incidental contact with other surfaces (e.g., a vehicle floor). The path of the restraint 400 will form a force-vector that is divergent from the centerline of the bridge 900, whereby the bridge 900 will experience an eccentric loading. Turning now to FIGS. 30-34, it can be seen that the cross-section of the bridge 900 (see hatched sections with lines angled from top right to lower left) may be adjusted along its length to optimally match the forces realized by the eccentric loading, whereby tension in the restraint 400 will cause the column to flex in a direction that pushes the retractor portion downward into the supporting surface (e.g., the floor of the vehicle), rather than upward and away from that supporting surface. More particularly, at each cross section, the neutral axis NA in the bridge is slightly above the force vector FV imposed by the restraint 400 during a loading event (e.g., a vehicle accident) and its resultant eccentric loading. This will result in moments of inertial that cause any deformation to occur downward in the direction of the supporting surface where incidental contact is normally maintained, thus further stabilizing the system despite its fixed/free mounting condition (e.g., the retractor portion 10 will be pushed downward into a vehicle floor in the direction IC). The modified "hat-section" profile of the bridge 900 along its length is ideal for manufacturing as either a casting or a stamping since it easily accommodates adjusting or moving the neutral axis at various stations along the length of the column, while maintaining optimal draft angles and a natural parting line.

With particular reference to FIGS. 1, 2, 40, and 42 (see retractor modules 1e, 1c, and 1d), the retractor module 1 may include a flange portion 70 for mating two retractor modules 1 back-to-back. As shown, the flange portion 70 may comprise a plurality of multi-level tabs 72, 74, 76 which overlap with corresponding multi-level tabs 72, 74, 76 of a second retractor module, where the second retractor module may be shifted slightly to either side of the first retractor module. More specifically, as shown in FIG. 40, tabs 74 and 76 of a first retractor module may sit in underlying and overlying relation to tabs 76 and 74, respectively, of a second retractor module (with fasteners being inserted through the apertures in the two overlying sets of tabs). Alternatively, as shown in FIG. 42, tabs 72 and 74 of a first retractor module may sit in overlying and underlying rela-tion to tabs 74 and 72 of a second retractor module (again, with fasteners being inserted through the apertures in the two overlying sets of tabs).

Turning now to FIGS. 37-61, a plurality of retractor modules 1a, 1b, 1c, 1d, 1e may be combined and assembled in a common housing 1100 to form a wheelchair tie-down and occupant restraint system 1000 (also referred to as WTORS). In this case, the system 1000 includes both wheelchair tiedowns in the form of retractor modules 1a, 1b, 1c, 1d (four in number) and an occupant restraint which includes a lap belt in the form of retractor module 1e (additional belts may be included as described below). However, alternative embodiments may be configured without the occupant restraint 1e and with less than four tiedowns, such as a three-point, two-point, or one point system as described in the prior art. See, e.g., U.S. Pat. Nos. 9,107,786 and 10,071,004, incorporated herein by reference.

The system 1000 may include a housing 1100 which, in this case, generally comprises a bottom panel 1102 and a top panel 1104 which connect together to form a boundary or enclosure around a mostly or generally closed internal volume for holding system components (e.g., retractor modules 1a, 1b, 1c, 1d, 1e, and associated components). As will be described below, the housing 1100 may include various water resistant features, and other features that are designed to manage water/moisture and to redirect water/moisture away from sensitive components.

Retractor modules 1a, 1b, 1c, 1d are configured to function as tiedowns for a wheeled mobility device (e.g., a wheelchair). In that respect, Retractor modules 1a, 1b, 1c, 1d may be identical to the retractor module 1 described above and shown in FIGS. 1-34, and may include any one or more of (or all of, as shown) the retractor portion 10, the restraint guide portion 20, and the retractor actuator portion 30.

Retractor module 1e is configured to function as a part of an occupant restraint. In that respect, retractor module 1e may be similar to the retractor module 1 described above and shown in FIGS. 1-34 and may include any one or more of the retractor portion 10, the restraint guide portion 20, and the retractor actuator portion 30. However, certain changes and additions may be made to the retractor module 1 to allow retractor module 1e to function better as part of an occupant restraint. For example, as shown the retractor module 1e includes both the retractor portion 10 and the retractor actuator portion 30 as described above and shown in FIGS. 1-34, but omits the restraint guide portion 20. As an alternative to the restraint guide portion 20, retractor module 1e may be combined with a roller assembly 20e comprising a roller bracket 1144, roller 1146 and screw/nut 1148 for guiding the free end 402e, where the roller assembly 20e may be anchored to the housing 1100 separately from the retractor and restraint guide portions 10, 30 of the retractor module 1e, as described in more detail below. In addition, the hook 404 of retractor module 1 may replaced with a tongue and/or female pin connector 404e located at the free end 402e of retractor module 1e, where the connector 404e may be adapted to mate with one of or either of a pin and a buckle, which would be incorporated with an occupant lap and shoulder belt as described in more detail below. Even further, the retractor module may be combined with a tongue or (as shown) pin connector 1150, which also mates with a female pin connector or buckle of an occupant lap and shoulder belt. As will be described in more detail below, the retractor module 1e and roller assembly 20e will be disposed on a right side of the housing 1100 and the pin connector 1150 on the left side (as shown in FIGS. 37 and 42) for a left vehicle wall-side installation. The retractor module 1e and roller assembly 20e may be swapped to the left side of the housing 110 and the pin connector 1150 swapped to the right side for a right vehicle wall-side installation (as shown in FIG. 40).

The bottom panel 1102 and the top panel 1104 may be configured to connect together at their respective perimeters using various connective elements, including snapping features integrated into the panels, separate snaps attached to the panels, glue, and other types of fasteners, including screws, nuts and bolts, rivets, etc. As shown, a plurality of screws 1124 inserted through a plurality of apertures 1126 in the top panel 1104 and washer 1128 engage with a plurality of rivet nuts 1130 fixed to the bottom panel 1102 in apertures 1132, to secure the panels 1102, 1104 together (six such connections shown in FIG. 40, although any number may be provided as required for strength, etc.).

Each of the bottom panel 1102 and top panel 1104 may be thermo- or vacuum-formed from a sheet plastic material, or may be constructed using alternative methods, such as rotational molding or injection molding. The panels 1102, 1104 may include a plurality of pockets for holding various system components, as described below. In addition, the panels 1102, 1104 may include a plurality of ribs or other contours providing at least some level of structural rigidity, whereby the system 1000 can be easily transported, handled/moved, and installed without undue bending or flexing or breaking. Moreover, the top panel 1104 needs to be adequately supported, for example, through strategically placed ribs in the bottom panel 1102, so that a heavy wheelchair can drive and other occupants can walk over the system 1000 without undue bending or flexing or breaking. However, the housing 1100 need not be designed with the structural rigidity or strength to withstand accident level loads. In fact, as described in more detail below, the housing 1100 may be isolated from the load paths of the tiedowns 1a, 1b, 1c, 1d and occupant restraints 1e; instead of passing through the housing 1100, the loads absorbed by the system 1000 during an accident will bypass the housing 1100 and be passed directly to the vehicle through individual anchors for the various retractor modules. In that respect, the housing does not serve as a load path for accident loads and need not be directly secured to the vehicle, although it may be, including incidentally through the anchor points for each of the retractor modules 1a, 1b, 1c, 1d and the occupant restraints 1e (other components of occupant restraints), as shown.

The housing 1100 in plan view (i.e., from the top) may be roughly rectangular in shape with dimensions of approximately 30"×52" (761.82 mm×1320.62 mm), although it may have a width $W_f$ at the end adapted to be forward facing (toward the front of the vehicle) that is greater than a width $W_r$ at the end adapted to be rear facing (toward a rear of the vehicle)–$W_f$ of approximately 29.993" (761.82 mm) and $W_r$ of approximately 26.191" (665.25 mm). In that respect, the side edges of the housing may have a linear/ramped shape or, as shown, may have one step 1106, 1108 on each side, or multiple steps on each side, giving the side edges a stepped configuration. Further, the relationship of the widths $W_f$, $W_r$ defines recessed areas 1110, 1112 in the rear half of the housing 1110 which permits the system 1000 to be installed closely adjacent the side wall of the vehicle with the vehicle wheel well extending into one of the recessed areas 1110, 1112 (depending upon which side of the vehicle the system 1000 is being installed). In many vehicles, this means that two systems 1000 may be installed side by side, one on the left and one on the right, even when the systems 1000 are overlapped with the vehicle wheel wells. For the avoidance of doubt, it is contemplated that the system 1000 need not be installed forward facing as described. It could be installed side facing or even rear facing.

The housing 1100 may, as shown, include corresponding nesting features that allow two systems 1100 to be stacked front to rear in a vehicle, where the housings 1100 of the two systems will overlap in some respect. Indeed, the front edge of the housing 1100 may include a concave (or recessed) portion 1114, whereby the front restraint modules 1c, 1d may be shifted outward of the concave portion 1114, to the left and the right. In this position, the free ends 402c, 402d of the front restraint modules 1c, 1d will be in an ideal location for securing a front of a wheelchair, i.e., as far forward in the system 1000 as practically/reasonably possible and to the outside of where the front wheels of a wheelchair are likely to sit. In contrast, the rear edge of housing 1100 may include a corresponding convex (or projected) portion 1116, whereby the rear restraint modules 1a, 1b may be shifted inward in (more central to) the convex portion 1116. In this position, the free ends 402a, 402b of the rear restraint modules 1a, 1b will be in an ideal location for securing a rear of a wheelchair, i.e., as far rearward as practically/reasonably possible and to the inside of where the rear wheels of a wheelchair are likely to sit. The shapes and sizes of the concave portion 1114 and convex portion 1116 are such two systems 1000 can nest together with the concave portion 1114 of the rear system 1000 can receive the convex portion 1114 of the front system, with the concave and convex portions 1114, 1116 either touching or closed spaced from each other.

The top panel 1104 may include various features for receiving or holding the free ends 402a, 402b, 402c, 402d, 402e of the restraint modules 1a, 1b, 1c, 1d, 1e adjacent or generally flush against the upper floor surface 1122 of the top panel 1104. For instance, recessed pockets 1134a, 1134b, 1134c, 1134d, 1134e1, 1134e2 may, for example, be embossed during the forming process for receiving connection members 404a, 404b, 404c, 404d, 404e. Note that two recessed pockets 1134e1, 1134e2 are provided for receiving a single connection member 404e, although obviously only one of the two pockets 1134e1, 1134e2 will be used for a single installation. As will be described below, the occupant restraint retractor module 1e may be installed on a right side of the system 1000 when the system is configured for installation adjacent a left vehicle wall. In such a configuration, the connection member 404e will sit in pocket 1134e2 in a stored configuration (see, e.g., FIGS. 37 and 42). Alternatively, the occupant restraint retractor module 1e may be installed on a left side of the system 1000 when the system is configured for installation adjacent a right vehicle wall (see, e.g., FIG. 40). In such a configuration, the connection member 404e will sit in pocket 1134e1 in a stored configuration. Recessed pockets 1134a, 1134b, 1134c, 1134d, 1134e1, 1134e2 may simply receive the connection members 404a, 404b, 404c, 404d, 404e, where the weight of the connection members hold them in place. Alternatively, recessed pockets 1134a, 1134b, 1134c, 1134d, 1134e1, 1134e2 may hold the connection members 404a, 404b, 404c, 404d, 404e by friction or interference fit, for example, through engagement with corresponding side edges. In yet alternative embodiments, each of the recessed pockets 1134a, 1134b, 1134c, 1134d, 1134e1, 1134e2 and/or may connection members 404a, 404b, 404c, 404d, 404e comprise a magnet or ferromagnetic material, where the connection members 404a, 404b, 404c, 404d, 404e are held in place by magnetic forces.

The top cover 1104 may further include additional markings or embossed features that provide instructional indicators for the wheelchair passenger, attendant, or vehicle driver. For instance, top cover 1104 may include one or more wheel locators 1136*a*, 1136*b* and directional indicators 1138*a*, 1138*b*, for example in the form of a marking (sticker, paint, etc) or (as shown) an embossed feature, which provide an indication of where to locate the wheeled mobility device for securement (e.g., locators 1136*a*, 1136*b* in the form of lines extending from front to rear of the wheelchair securement area) and in which direction (e.g., directional indicators 1138, 1138*b* in the form of arrows pointing in the forward direction).

The top cover may further include apertures 1140*a*, 1140*b*, 1140*c*, 1140*d*, 1140*e*1, 1140*e*2 which are adapted to receive the free ends 402*a*, 402*b*, 402*c*, 402*d*, 402*e* therethrough. The apertures 1140*a*, 1140*b*, 1140*c*, 1140*d*, 1140*e*1, 1140*e*2 ideally are large enough that connection members 404*a*, 404*b*, 404*c*, 404*d*, 404*e* may fit therethrough (as shown), which simplifies that assembly/disassembly process (i.e., allows retractor modules to be completely assembled separate from the housing). Covers 1142*a*, 1142*b*, 1142*c*, 1142*d*, 1142*e*1, 1142*e*2 may be inserted into the apertures 1140*a*, 1140*b*, 1140*c*, 1140*d*, 1140*e*1, 1140*e*2 and around the free ends 402*a*, 402*b*, 402*c*, 402*d*, 402*e* of the retractor modules 1*a*, 1*b*, 1*c*, 1*d*, 1*e* and the tongue/pin connector 1150. Or, as shown, the covers 1142*a*, 1142*b*, 1142*c*, 1142*d*, 1142*e*2 may include: (a) one or more engagement members or clips 1152 that connect to the retractor modules 1*a*, 1*b*, 1*c*, 1*d*, 1*e* at for example their rollers 918, 1146 and/or roller pins 920, 1148; and/or (b) projection(s) 1154 extending from the perimeter for engaging with an underside of the top panel 1104. The cover 1142*e*1 may also include (a) on or more engagement members or pegs 1158 that connect to the pin connector 1150; and/or (b) projection(s) 1156 extending from the perimeter for engaging with an underside of the top panel 1104. The covers 1142*a*, 1142*b*, 1142*c*, 1142*d*, 1142*e*1, 1142*e*2 have a smaller opening than the apertures 1140*a*, 1140*b*, 1140*c*, 1140*d*, 1140*e*1, 1140*e*2, and will thereby reduce or prevent water and dirt intrusion into the housing 1100.

With particular reference to FIGS. 40 and 42, the bottom panel 1102 may include a plurality of pockets or cradles 1160*a*, 1160*b*, 1160*c*, 1160*d* for each of the retractor modules 1*a*, 1*b*, 1*c*, 1*d*. The bottom panel 1102 may also include a first pocket 1160*e*1 and restraint channel 1166*e*1 for receiving the retractor module 1*e* and restraint 400*e* when the system 1000 is located adjacent a right vehicle wall (whereby retractor module 1*e* would be attached back-to-back with retractor module 1*c*), and a second pocket 1160*e*2 and restraint channel 1166*e*2 for receiving the retractor module 1*e* and restraint 400*e* when the system 1000 is located adjacent a left vehicle wall (whereby retractor module 1*e* would be attached back-to-back with retractor module 1*d* via at least one or as shown two fasteners 1168). The pockets 1160*a*, 1160*b*, 1160*c*, 1160*d*, 1160*e*1, 1160*e*2 and restraint channels 1166*e*1, 1166*e*2 may include a plurality of side walls (e.g., 1162) that extend upward from a bottom wall (e.g., 1164). The side walls (e.g., 1164) serve not only to generally define the boundaries of the pockets 1160*a*, 1160*b*, 1160*c*, 1160*d*, 1160*e*1, 1160*e*2 and channels 1166*e*1, 1166*e*2 but also define ribs that provide structural support for the top panel 1104. As shown, the pockets 1160*a*, 1160*b*, 1160*c*, 1160*d*, 1160*e*1, 1160*e*2 may correspond generally to the shape of the retractor modules 1*a*, 1*b*, 1*c*, 1*d*, 1*e* and are adapted to locate the free ends 402*a*, 402*b*, 402*c*, 402*d* in desired locations or direct the free end 402*e* in the correction direction; for example, as discussed above, locating free ends 402*a*, 402*b* central to the convex portion 1116 and free ends 402*c*, 402*d* to the outside of concave portion 1114, and directing free end 402*e* through channels 1166*e*1, 1166*e*2. The pockets 1160*a*, 1160*b*, 1160*c*, 1160*d* may engage via friction or interference fit to hold the retractor modules 1*a*, 1*b*, 1*c*, 1*d* firmly in place, or those modules may be permitted to float between side walls until anchored, as discussed below.

Retractor modules 1*a*, 1*b*, 1*c*, 1*d* each include a single anchor 922*a*, 922*b*, 922*c*, 922*d* for independently anchoring the respective retractor module to the vehicle, and thereby transferring at least the loads of the wheelchair to the vehicle frame. By virtue of its connection to either retractor modules 1*c* or 1*d*, one of anchors 922*c* or 922*d* may also serve to transfer some of the occupant loads to the vehicle frame. Each anchor may pass through a corresponding aperture 1170*a*, 1170*b*, 1170*c*, 1170*d* in the bottom panel 1102, whereby the housing 1100 will be incidentally secured to the vehicle. Bracket 1172 with corresponding apertures may be provided at the interface between retractor modules 1*a*, 1*b*, anchor 922*a*, 922*b*, and apertures 1170*a*, 1170*b* of bottom panel 1102 to provide a more rigid and stronger connection between the housing 1110 and the vehicle that will better distribute loads and be less likely to break the plastic panel 1102. Brackets 1174, 1176 provide a similar structure and function for the retractor modules 1*c*, 1*d*, anchor 922*c*, 922*d*, and apertures 1170*c*, 1170*d* of bottom panel 1102.

Two additional anchors 922*e*1, 922*e*2 may be provided for securing tongue or pin connector 1150 and roller assembly 20*e* to the vehicle, for transferring loads from the occupant restraints to the vehicle frame. Those anchors also pass through additional apertures 1170*e*1, 1170*e*2 in the bottom panel 1102.

Notably, the bottom cover 100 of each retractor module 1*a*, 1*b*, 1*c*, 1*d*, 1*e* may sit flush or nearly flush against a bottom surface of the bottom panel 1102, while the top cover 200 of each may sit flush against the underside of the top surface of the top panel 1104. In that respect, the retractor modules 1*a*, 1*b*, 1*c*, 1*d*, 1*e* will serve to transfer not only the static weight of the wheelchair and wheelchair occupant to the vehicle floor, but also the dynamic downward forces of the same during vehicle maneuvers and vehicle accidents. Obviously, the retractor modules 1*a*, 1*b*, 1*c*, 1*d*, 1*e*, ideally being constructed of a metal material, will be able to withstand significantly higher compressive forces than the plastic ribs formed in the bottom panel 1102, and will therefore serve to resist significant downward movement of the vehicle during an accident or other aggressive vehicle maneuver.

With particular reference to FIG. 41, the housing 1100 may sit directly on top of the OEM flooring 44 (shown in this case as a corrugated floor) may have a thin profile with a thickness TH roughly equal to or slightly greater than that of typical aftermarket flooring 40 (a typical aftermarket flooring may comprise a plywood panel/subfloor with a vinyl covering or lamination, for a total thickness of about 0.88"). In one embodiment, the housing 1100 may have a thickness TH of approximately 1.354" (34.38 mm). In other embodiments, the housing 1100 may sit slightly proud of the aftermarket flooring 40 by a thickness $T_P$ of approximately ½" (12.88 mm) or less or approximately ¼" (6.44 mm) or less. The housing 1100 may have overhangs 1118 on any of the edges (front, rear, left side, right side, corners, etc.) which at least partially overlap the aftermarket flooring 40 and which may define a sloped upper surface 1120, extending from the top surface 42 of the aftermarket flooring 40 to the upper floor surface 1122 of the housing 1110. The overhang 1118 may be defined by one or (as shown) both the bottom panel 1102 and the top panel 1104, where the overhang 1118 on the bottom panel 1102 and top panel 1104 nest against each other and angle downward (i.e., slope or curve downward), to resist water intrusion (e.g., form a water-resistant seal) between the panels 1102, 1104 at the edges. The sloped upper surface 1120 of the overhang 1118 may provide a beveled edge that will not present a substantial tripping hazard and/or assists in a wheeled device driving or rolling from the aftermarket flooring 40 onto the upper floor surface 1122 of the housing 1100. Additionally, the overhangs 1118 may be biased downwardly, where the tips will be forced into contact or compression with (e.g., dig into) the top surface of the aftermarket flooring when the system 1000 is secured against the vehicle flooring 44, and may therefore form a water-resistant seal with at the perimeter of the housing 1100 that resists water intrusion between the panels 1102, 1104 and below the housing 1100.

Turning now primarily to FIGS. 40, 42, 45, and 46, the system 1000 may further be provided with manual levers for locking/unlocking each of the retractor modules as previously described (where a user could operate the levels from outside of the housing 1100) or may be provided with a mechanically operable or (as shown) an electronically operable control system 1200 for actuating/operating the retractor modules 1a, 1b, 1c, 1d, 1e. The control system 1200 may comprise a controller 1202, a plurality of actuators 1204a, 1204b, 1204c, 1204d, and 1204e (i.e., one for each retractor module 1a, 1b, 1c, 1d, 1e), a wiring harness 1206 with connectors for the controller 1202, the actuators 1204a, 1204b, 1204c, 1204d, 1204e, a user panel 1208 (which may comprise a button (as shown), a plurality of buttons, or a touch screen with one or more buttons, which may be mounted on any surface of the vehicle, including a wall, and which may be a remote transmitter or mobile phone/tablet app that communicates wirelessly with the controller 1202), and the vehicle 1210 (which may provide a power supply and ground for the system, and may provide a vehicle interlock that prevents operation of the vehicle (turning on, or putting into gear/out of park) when the system 1000 is in an unsafe condition—e.g., when the retractor modules are unlocked). Each of the actuators 1204a, 1204b, 1204c, 1204d, 1204e sits within one of the cradles 124, 126 and includes a shaft interconnected with the trigger 802 of the respective retractor module 1a, 1b, 1c, 1d, 1e for moving the trigger 802 between the locked and unlocked positions. Pressing the button of the user panel 1208 sends a signal to the controller 1202 through the wiring harness 1206. The controller 1202 may include a processor that is programmed to respond to that signal by operating at least one or more of the actuators 1204a, 1204b, 1204c, 1204d, 1204e to unlock one or more of the retractor modules 1a, 1b, 1c, 1d, 1e. The unlocked retractor modules 1a, 1b, 1c, 1d, 1e will be held in the unlocked condition for a predetermined period of time (either factory set or custom set by installer or user via controller 1202), allowing time for a wheelchair and wheelchair occupant to be secured or unsecured. After the predetermined time expires, the controller 1202 will again operate the respective actuators 1204a, 1204b, 1204c, 1204d, 1204e to lock the respective retractor modules 1a, 1b, 1c, 1d, 1e. The controller 1202 sends an interlock signal (which interlock signal could be an absence of a signal) to the vehicle 1210 to prevent operation of the vehicle when any one or more of the retractor modules 1a, 1b, 1c, 1d, 1e are in an unsafe, unlocked condition.

Turning back now primarily to FIGS. 40 and 42, the bottom panel 1102 includes an additional pocket 1178 and additional channels (e.g., 1180) for holding the controller 1202 and routing the wiring harness 1206 to the various actuators 1204a, 1204b, 1204c, 1204d, 1204e, vehicle 1210, and user panel 1208. As with the previously described pockets in the bottom panel 1102, pocket 1178 and channel 1180 may include a plurality of side walls (e.g., 1182) that extend upward from a bottom wall (e.g., 1184) to not only generally define the boundaries of the pocket 1178 and channel 1180, but also to define ribs that provide structural support for the top panel 1104. The pocket 1178 may engage via friction or interference fit to hold the controller 1202 firmly in place, or those modules may be permitted to float between side walls until anchored, as discussed below. Ideally, the bottom walls (e.g., 1184) of the pocket 1178 and channel 1180 sit higher than at least one of the other pockets or bottom walls of the bottom panel 1102, whereby water will drain via gravity to a lower elevation and away from controller 1202, wiring harness 1206, and actuators 1204a, 1204b, 1204c, 1204d, 1204e.

Turning now primarily to FIGS. 47-54, an example installation of the system 1000 is shown. In a first step (FIG. 47), various reinforcing structures 1302, 1304, 1306, 1308 may be added to a vehicle chassis or frame 1300. In an alternative embodiment, the system would be installed directly on an OEM vehicle floor (for example, the corrugated flooring of a van), as opposed to "floor" 1380. Next (FIG. 48), a plywood or other material panel (or subfloor) 1310, which includes a previously-cut hole 1312 adapted to receive the system 1000, may be dropped on top of the reinforcing structures 1302, 1304, 1306, 1308. Next (FIG. 49), a vinyl covering 1314, also with a previously-cut hole 1316, may be dropped on top of the panel 1310. Next (FIG. 50), the bottom panel 1102 of the system 1000 (holding system components) is inserted into the holes 1312, 1316 defined by panel 1310 and covering 1314. Anchors 922a, 922b, 922c, 922d, 922e1, 922e2 are then used to affix the retractor modules 1a, 1b, 1c, 1d, roller assembly 20e, and tongue or pin connector 1150 to at least one of the reinforcing structures 1302, 1304, 1306, 1308 and/or vehicle chassis or frame 1300 (FIG. 51). The anchors 922a, 922b, 922c, 922d, 922e1, 922e1 may be used in combination with additional washers and nuts for a solid connection. Next (FIG. 52), covers 1142a, 1142b, 1142c, 1142d, 1142e1, and 1142e2 are snapped into place. Next (FIGS. 53, 54), the top panel 1104 is dropped onto the system and a plurality of fasteners 1124 are used to secure the top panel 1104 to the bottom panel 1102. Finally, occupant restraints will be installed adjacent the system 1000, likely on the adjacent wall, ceiling, and/or floor surface, the user panel 1208 will be installed, likely on the wall adjacent the system, and the wiring harness 1206 will be connected to the vehicle 1210 and the user panel 1208.

In that regard, FIGS. 55-58 shows a full installation and use of a system 1000 with an occupant restraint 1400 and user panel 1208. The occupant restraint generally includes a first retractor 1402 fixed to the floor or wall with a retractable belt 1404 having a pin connector 1406 at its end. The retractable belt passes through In particular, to use the system 1000, the passenger enters the securement area and positions the wheelchair on top of the top panel 1104, generally central to the free ends 402a, 402b, 402c, 402d of the retractor modules 1a, 1b, 1c, 1d. The operator then presses the button on the user panel 120 to release all in-floor securements (i.e., the retractor modules 1a, 1b, 1c, 1d, 1e). After the button is pressed, the operator will have a predetermined period of time (for example, 2 minutes) to attach all restraints and the occupant belt (as shown). More particularly, the hooks 404*a*, 404*b*, 404*c*, 404*d* are attached generally at all four corners of the wheelchair, to designated wheelchair anchor points or structural members on the wheelchair, ideally with the restraint extending at 45° (or the range of angles described above) from floor to the anchor point. To secure the occupant, a female pin connector 1404 at the and the tongue connector 404*e* is connected to a buckle on the occupant restraint In any version of any embodiment described herein, the restraint may take any form, such as webbing, belt, cable, chain, rope, string, etc. The guide members may also take any form, such as a roller, a pin, a contoured surface, an aperture, etc. Likewise, the connector may take any form, such as a hook, a clip, a buckle, a tongue, etc.

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. Therefore, the spirit and scope of the appended claims should not be limited to the description of the embodiments contained herein.

We claim:

1. A securement system for securing a wheeled mobility device in a vehicle, the vehicle having a floor panel with a bottom surface defining a first plane and an upper surface defining a second plane, the securement system comprising at least one retractor, wherein the at least one retractor comprises a drum holding a flat belt and configured to rotate about a drum axis, whereby the drum axis is substantially perpendicular to the second plane, wherein the at least one retractor sits no higher than approximately ½" above the second plane, the securement system further comprising a guide member for guiding the flat belt, wherein the flat belt includes a twisted region as the flat belt extends from the drum to the guide member and, a twist angle in the twisted region is greater than 0°.

2. The securement system of claim 1, the distance between the first plane and the second plane is less than approximately 2" and substantially all of the at least one retractor sits above the first plane.

3. The securement system of claim 1, wherein the twist angle is approximately 90° and a width of the flat belt at the guide member is aligned generally parallel to the second plane.

4. The securement system of claim 2, wherein the twist angle is approximately 90° and a width of the flat belt at the guide member is aligned generally parallel to the second plane.

5. The securement system of claim 4 securing the wheeled mobility device in the vehicle, wherein: the flat belt extends from the drum to the wheeled mobility device; the flat belt comprises a substantially straight first line between the drum and the guide member that defines a first restraint longitudinal axis and a substantially straight second line between the guide member and the wheeled mobility device that defines a second restraint longitudinal axis; and, a redirect angle between the first restraint longitudinal axis and the second restraint longitudinal axis is greater than approximately 90° and less than approximately 180°.

6. The securement system of claim 5, wherein the redirect angle between the first restraint longitudinal axis and the second restraint longitudinal axis is between approximately 120° and approximately 150°.

7. A vehicle comprising: an OEM floor; a floor panel disposed on top of the OEM floor and having a bottom surface defining a first plane, an upper surface defining a second plane, and an aperture; a securement system for securing a wheeled mobility device, the securement system comprising at least one retractor disposed in the aperture of the floor panel, wherein substantially all of the at least one retractor sits on top of the OEM floor and no higher than approximately ½" above a top surface of the floor panel, wherein the retractor comprises a drum that rotates relative to a retractor frame about a rotational axis, wherein the rotational axis is substantially perpendicular to the second plane, wherein the drum holds a flat belt and the securement system further comprises a guide member for guiding the flat belt, wherein the flat belt includes a twisted region as the flat belt extends from the drum to the guide member and, a twist angle in the twisted region is greater than 0°.

8. The vehicle of claim 7 wherein the securement system further comprises a housing holding the at least one retractor; and substantially all of the housing sits above the first plane and no higher than approximately ½" above the second plane.

9. The vehicle of claim 8, wherein the housing comprises a top panel that defines a securement floor area for the wheeled mobility device.

10. The vehicle of claim 7, wherein the twist angle is approximately 90° and a width of the flat belt at the guide member is aligned generally parallel to the second plane.

11. The vehicle claim 7 with the securement system securing the wheeled mobility device, wherein: a restraint extends from the drum to the wheeled mobility device; the restraint comprises a substantially straight first line between the drum and the guide member that defines a first restraint longitudinal axis and a substantially straight second line between the guide member and the wheeled mobility device that defines a second restraint longitudinal axis; and, a redirect angle between the first restraint longitudinal axis and the second restraint longitudinal axis is greater than approximately 90° and less than approximately 180°.

12. The vehicle of claim 11, wherein the redirect angle between the first restraint longitudinal axis and the second restraint longitudinal axis is between approximately 120° and approximately 150°.

13. The vehicle of claim 7, wherein a distance between the first plane and the second plane is less than approximately 2".

14. The vehicle of claim 7, wherein a distance between the first plane and the second plane is less than approximately 1".

15. A securement system for securing a wheeled mobility device in a vehicle, the securement system comprising at least one retractor, wherein the at least one retractor comprises a drum holding a flat belt and configured to rotate about a drum axis, the securement system further comprising a guide member for guiding the flat belt, wherein the flat belt includes a twisted region as the flat belt extends from the drum to the guide member and, a twist angle in the twisted region is greater than 0°.

16. The securement system of claim 15, wherein the twist angle is approximately 90°.

17. The securement system of claim 15 securing the wheeled mobility device in the vehicle, wherein: the flat belt extends from the drum to the wheeled mobility device; the flat belt comprises a substantially straight first line between the drum and the guide member that defines a first restraint longitudinal axis and a substantially straight second line between the guide member and the wheeled mobility device that defines a second restraint longitudinal axis; and, a redirect angle between the first restraint longitudinal axis and the second restraint longitudinal axis is greater than approximately 90° and less than approximately 180°.

18. The securement system of claim 17, wherein the redirect angle between the first restraint longitudinal axis and the second restraint longitudinal axis is between approximately 120° and approximately 150°.

19. The securement system of claim 15, wherein the retractor is mounted to a surface of the vehicle, wherein the drum axis is generally perpendicular to the surface.

20. The securement system of claim 19, wherein the twist angle is approximately 90° and a width of the flat belt at the guide member is aligned generally parallel to the surface.

\* \* \* \* \*